US012059795B2

(12) United States Patent
Fiferna et al.

(10) Patent No.: US 12,059,795 B2
(45) Date of Patent: Aug. 13, 2024

(54) HAND MACHINE TOOL WITH HANDLE HOUSING PART THAT CAN BE MOUNTED IN ANGULAR POSITIONS

(71) Applicant: Festool GmbH, Wendlingen (DE)

(72) Inventors: Jaroslav Fiferna, Ceska Lipa (CZ); Jiri Blazek, Lindava (CZ); Jürgen Stoll, Weilheim Teck (DE)

(73) Assignee: FESTOOL GMBH, Wendlingen (DE)

( * ) Notice: Subject to any disclaimer, the term of this patent is extended or adjusted under 35 U.S.C. 154(b) by 0 days.

(21) Appl. No.: 18/085,696

(22) Filed: Dec. 21, 2022

(65) Prior Publication Data

US 2023/0249331 A1 Aug. 10, 2023

(30) Foreign Application Priority Data

Dec. 22, 2021 (DE) ..................... 10 2021 134 359.3

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 3,952,239 A * 4/1976 Owings ..................... B25F 5/02 173/171
5,318,158 A * 6/1994 Seasholtz .................. A47L 9/26 439/457

(Continued)

FOREIGN PATENT DOCUMENTS

DE 40 22 668 A1 1/1992
DE 195 46 328 A1 6/1997

(Continued)

OTHER PUBLICATIONS

German Examination Report.

*Primary Examiner* — Lucas E. A. Palmer
(74) *Attorney, Agent, or Firm* — Hoffmann & Baron, LLP

(57) ABSTRACT

A hand-held power tool (10), in particular a grinding machine or cutting machine, having a machine housing (20) in which a drive motor (11) for driving a tool holder (13) for a work tool (14), in particular a grinding tool or cutting tool, is accommodated, wherein the machine housing (20) has a drive housing part (30) and a handle housing part (40), wherein the drive housing part (30) has the tool holder (13) drivable by the drive motor (11) and the handle housing part (40) has a grip section (25) to be grasped by an operator, wherein the handle housing part (40) protrudes from the drive housing part (30) in the direction of a machine longitudinal axis (ML), wherein the handle housing part (40) is mounted on the drive housing part (30) in a mounted state. A form-fitting contour (32) is arranged on the drive housing part (30) and a counter-form-fitting contour (42) is arranged on the handle housing part (40), which in the mounted state engage in a form-fitting manner in at least two different mounting angular positions (W1, W2) in order to hold the handle housing part (40) on the drive housing part (30) in a rotationally fixed and axially immovable manner with respect to the machine longitudinal axis (ML).

22 Claims, 8 Drawing Sheets

(56) References Cited

U.S. PATENT DOCUMENTS

| | | | | | |
|---|---|---|---|---|---|
| 5,379,846 | A * | 1/1995 | Wagster | B25F 5/02 | 403/312 |
| 5,407,381 | A | 4/1995 | Schaefer et al. | | |
| 5,681,214 | A | 10/1997 | Kleider et al. | | |
| 6,026,910 | A * | 2/2000 | Masterson | B25F 5/006 | 267/141.1 |
| 6,181,032 | B1 * | 1/2001 | Marshall | B25F 3/00 | 200/321 |
| 6,293,859 | B1 * | 9/2001 | Fink | B25F 5/02 | 451/344 |
| 6,912,790 | B2 * | 7/2005 | James | B23D 51/01 | 30/392 |
| 7,204,744 | B2 * | 4/2007 | Lamprecht | B25F 5/006 | 451/357 |
| 2004/0016134 | A1 * | 1/2004 | Bednar | B25F 5/02 | 30/340 |
| 2004/0148789 | A1 * | 8/2004 | Gist | B25F 5/02 | 30/392 |
| 2006/0025060 | A1 | 2/2006 | Funk | | |
| 2006/0258274 | A1 * | 11/2006 | Oki | B25F 5/006 | 451/358 |
| 2008/0223594 | A1 * | 9/2008 | Eisenhardt | B25F 5/006 | 173/162.2 |
| 2010/0281697 | A1 * | 11/2010 | Tate | A01G 3/053 | 30/312 |
| 2014/0158391 | A1 * | 6/2014 | Xin | B25F 5/02 | 173/170 |
| 2015/0041166 | A1 * | 2/2015 | Van Der Linde | B25F 3/00 | 173/29 |
| 2018/0147686 | A1 * | 5/2018 | Valentini | B24B 23/005 | |
| 2019/0358769 | A1 * | 11/2019 | Miyazawa | B24B 23/02 | |
| 2021/0237249 | A1 * | 8/2021 | Fischer | B25F 5/02 | |
| 2023/0041828 | A1 * | 2/2023 | Takahashi | A01G 3/053 | |

FOREIGN PATENT DOCUMENTS

| | | | |
|---|---|---|---|
| DE | 10 2004 027 069 | A1 | 1/2005 |
| DE | 10 2004 036 420 | A1 | 3/2006 |
| EP | 2 163 344 | B1 | 11/2014 |
| EP | 3 623 111 | A1 | 3/2020 |

* cited by examiner

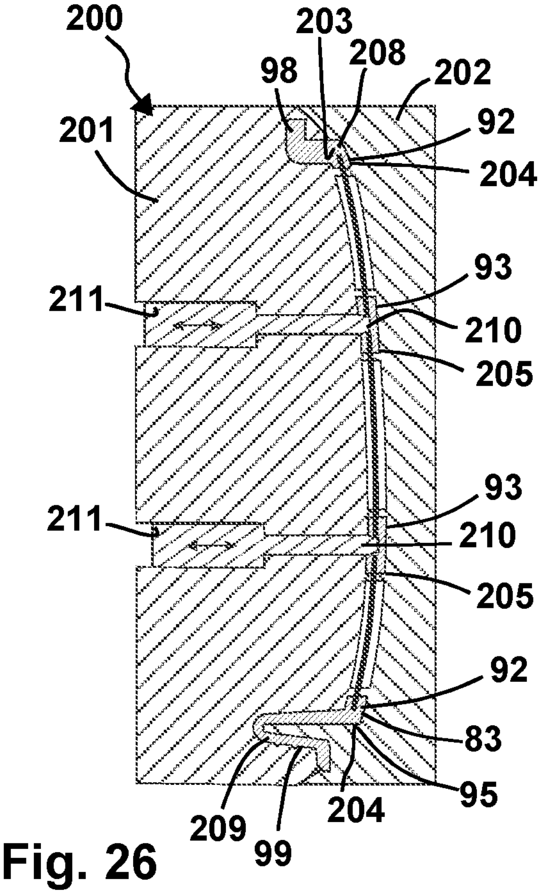
Fig. 26
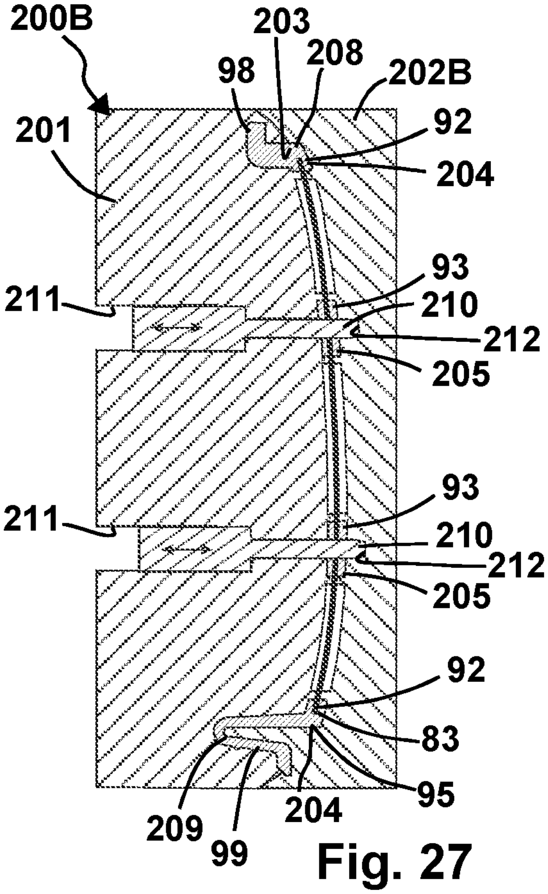
Fig. 27
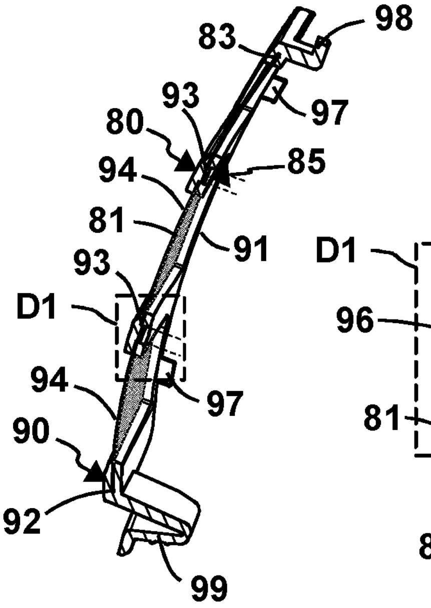
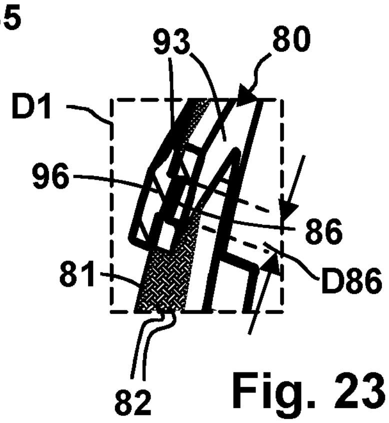
Fig. 23
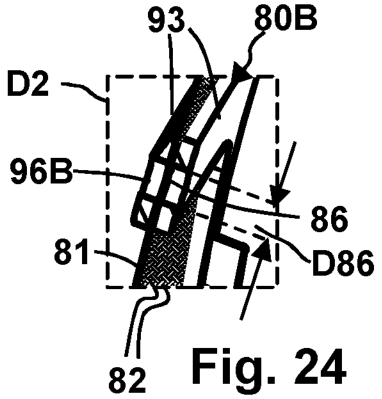
Fig. 24
Fig. 22

HAND MACHINE TOOL WITH HANDLE HOUSING PART THAT CAN BE MOUNTED IN ANGULAR POSITIONS

BACKGROUND OF THE INVENTION

The invention relates to a hand-held power tool, in particular a grinding machine or cutting machine, having a machine housing in which a drive motor for driving a tool holder for a work tool, in particular a grinding tool or cutting tool, is accommodated, wherein the machine housing has a drive housing part and a handle housing part, wherein the drive housing part has the tool holder drivable by the drive motor and the handle housing part has a grip section for an operator to grasp, wherein the handle housing part protrudes from the drive housing part in the direction of a machine longitudinal axis, wherein the handle housing part is mounted on the drive housing part in a mounted state.

Such a hand-held power tool is described, for example, in EP 2 163 344 B1. This hand-held power tool is designed as a hand-held grinding machine and has a machine housing having a drive housing part, in which the drive motor and an angular gear for driving a tool holder for a grinding tool are arranged, as well as a handle housing part protruding from the drive housing part, on which, for example, a switch for switching on and switching off the hand-held power tool is arranged. A handle bracket is arranged on the drive housing part, which the operator can grasp with one hand, while at the same time the grip section of the handle housing part can be grasped by the operator with his other hand. The operator can thus reliably guide the hand-held power tool with both hands. However, the ergonomics are not optimally suitable for every operator and for every work situation when using the hand-held power tool.

Hand-held power tools in which the handle housing part is rotatable relative to the drive housing part are described, for example, in DE 40 22 668 A1, DE 195 46 328 A1, DE 10 2004 027 069 A1, DE 10 2004 036 420 A1, US 2010/0281697 A1, US 2014/0158391A1.

A hand-held electrical appliance in which a handle is movable on the housing of the electrical appliance is explained in EP 3 623 111 A1.

SUMMARY OF THE INVENTION

It is therefore the object of the present invention to provide an improved hand-held power tool.

To achieve the object, it is provided in a hand-held power tool of the type mentioned at the outset that a form-fitting contour is arranged on the drive housing part and a counter-form-fitting contour is arranged on the handle housing part, which in the mounted state engage in one another in at least two different mounting angular positions in a form-fitting manner in order to hold the handle housing part on the drive housing part in a rotationally fixed and axially immovable manner with respect to the machine longitudinal axis.

An advantage of this solution can be seen in particular in the fact that the handle housing part and thus its grip section is mountable on the drive housing part ergonomically for the respective situation of the operator and/or the use of the hand-held power tool.

The term "rotationally fixed" is to be understood in particular as meaning that the drive housing part and the handle housing part are non-rotatable relative to one another in opposite rotational directions or are non-rotatable relative to one another in any rotational direction.

It is advantageous if the form-fitting contour and the counter-form-fitting contour are provided and designed for mounting the drive housing part and the handle housing part in mounting angular positions that are each at an angle of 90° to one another, i.e., for example two or four mounting angular positions, or 180° to one another, i.e., two mounting angular positions.

The form-fitting contour and the counter-form-fitting contour expediently form components of a mounting interface, by means of which the handle housing part and the drive housing part are mountable on one another.

In the mounted state, the handle housing part is held on the drive housing part both rotationally fixed with respect to the machine longitudinal axis and axially fixed in place with respect to the axis of rotation. Thus, the machine housing is dimensionally stable and can withstand the forces occurring during operation of the hand-held power tool.

An advantageous concept provides that the form-fitting contour is fixedly arranged on a drive housing body of the drive housing part or is integrally formed by the drive housing body. It is also expedient if the counter form-fitting contour is fixedly arranged on a handle housing body of the handle housing part or is integrally formed by the handle housing body. For example, the form-fitting contour or counter-form-fitting contour is formed by the material, in particular plastic or metal, of the drive housing body or the handle housing body. The form-fitting contour and/or the counter-form-fitting contour can also be held on the respective drive housing body or handle housing body, for example, by means of an adhesive bond, welded bond, or similar other materially-bonded connection. For example, the form-fitting contour and the counter-form-fitting contour are produced integrally with a wall on which the form-fitting contour or counter-form-fitting contour is arranged during injection molding or casting of a respective drive housing body or handle housing body.

The form-fitting contour and the counter-form-fitting contour are preferably not formed, or are not formed exclusively, by screws or other similar assembly means that are movable and/or detachably fastenable relative to the handle housing part or drive housing part.

Furthermore, it is advantageous if the drive housing part and the handle housing part are only mountable on one another and/or removable from one another using an assembly tool, in particular a screwing tool.

It is also advantageous if the drive housing part and the handle housing part are only adjustable relative to one another with respect to the machine longitudinal axis, in particular pivotable relative to one another, with the aid of an assembly tool, for example a screwing tool.

Furthermore, it is advantageous if the hand-held power tool does not have a locking device designed for direct and tool-free manual actuation for locking an engagement position in which the form-fitting contour and the counter-form-fitting contour are engaged with one another and the handle housing part is fixed on the drive housing part in a rotationally-fixed and axially movable manner with respect to the machine longitudinal axis.

It is advantageously provided that the form-fitting contour and the counter-form-fitting contour are fixable or are fixed on one another by means of one or more screws in an engaged position, in which the form-fitting contour and the counter-form-fitting contour engage in one another and the handle housing part is fixed on the drive housing part in a rotationally fixed and axially immovable manner with respect to the machine longitudinal axis.

It is advantageous if the form-fitting contour and the counter-form-fitting contour are fixable or are fixed in the engaged position exclusively by means of screws. It is also advantageous if the form-fitting contour and the counter-form-fitting contour can exclusively be removed or disengaged from one another when at least one screw is loosened, for the actuation of which a screwing tool is required.

Furthermore, it is advantageous if the form-fitting contour is arranged in a stationary manner on the drive housing part and/or the counter-form-fitting contour is arranged in a stationary manner on the handle housing part. Advantageously, both are provided, the form-fitting contour is arranged in a stationary manner on the drive housing part and the counter-form-fitting contour is arranged in a stationary manner on the handle housing part.

It is advantageously provided that the form-fitting contour is arranged on a passage opening in the drive housing part and the counter-form-fitting contour is arranged on a passage opening in the handle housing part, which are opposite to one another in the mounted state, so that interiors of the drive housing part and the handle housing part communicate with one another through the passage openings. For example, electrical connections can be established between the handle housing part and the drive housing part through the passage openings. It is also possible for a component arranged in the handle housing part or drive housing part, for example a printed circuit board or the like, to protrude through the passage openings into the drive housing part or handle housing part.

It is possible for the form-fitting contour and the counter-form-fitting contour to include bayonet contours, for example bayonet projections, bayonet hooks, or the like, and/or screw contours that can be engaged and disengaged by a rotational movement around the machine longitudinal axis. For example, the bayonet contours have the same angular distances with respect to the machine longitudinal axis, so that they can be engaged in the at least two different mounting angular positions. In the case of screw contours, it is possible that they comprise screw threads which are angularly spaced apart from one another and which are assigned to the mounting angular positions.

At least one fixing body, for example a screw, in particular a screw arrangement and/or a detent arrangement, can be provided for rotationally fixing the form-fitting contour and the counter-form-fitting contour.

A preferred concept provides that the form-fitting contour comprises an axial form-fitting contour and the counter-form-fitting contour comprises an axial counter-form-fitting contour, which in the mounted state engage in one another in a form-fitting manner and hold the handle housing part and the drive housing part on one another so they are axially immovable with respect to the machine longitudinal axis but are rotatable around the machine longitudinal axis.

For example, flange-like form-fitting contours can cause an axial fixation with respect to the machine longitudinal axis, but not a rotational fixation. A preferred concept provides, for example, that the form-fitting contour and the counter-form-fitting contour have a flange projection extending annularly around the machine longitudinal axis and a flange receptacle extending annularly around the machine longitudinal axis, which interlock in a form-fitting manner in the mounting position for the axially immovable fastening of the handle housing part on the drive housing part.

However, an axial form-fitting fixation of the handle housing part and the drive housing part can also be effectuated by the rotational form-fitting contours and counter-form-fitting contours explained hereinafter, i.e., the above-mentioned axially acting form-fitting contours, i.e., the axial form-fitting contour and the axial counter-form-fitting contour, are formed by the at least one rotational form-fitting contour and at least one rotational counter-form-fitting contour explained hereinafter.

Advantageously, it is provided that the form-fitting contour comprises at least one rotational form-fitting contour and the counter-form-fitting contour comprises at least two rotational counter-form-fitting contours assigned to the mounting angular positions and/or the form-fitting contour comprises at least two rotational form-fitting contours assigned to the mounting angular positions and the counter-form-fitting contour comprises at least one rotational counter-form-fitting contour, wherein in each mounting angular position at least one pair of rotational form-fitting contour and rotational counter-form-fitting contour is engaged and holds the drive housing part in a rotationally-fixed manner with respect to the machine longitudinal axis on one another. The at least one rotational form-fitting contour and the at least one rotational counter-form-fitting contour are advantageously arranged fixedly on the drive housing part and the handle housing part and can advantageously also provide an axial form-fitting fastening of the handle housing part on the drive housing part. It is possible, for example, that a rotational form-fitting contour is engaged in one mounting angular position with one of the rotational counter-form-fitting contours, while the or one other rotational counter-form-fitting contour remains free, with which the rotational form-fitting contour is engaged in the other mounting angular position. It is also possible for a counter-form-fitting contour to be engaged with a rotational form-fitting contour in one mounting angular position, while the other rotational form-fitting contour is not engaged with a rotational counter-form-fitting contour in this mounting angular position.

It is advantageous if the rotational form-fitting contour and the rotational counter-form-fitting contour can only be disengaged when the axial form-fitting contour and the axial counter-form-fitting contour are disengaged or at the same time as the rotational form-fitting contour and the rotational counter-form-fitting contour are disengaged.

For a radially form-fitting fixing of the drive housing part and the handle housing part on one another, it is sufficient if there is a single pair of rotational form-fitting contour and rotational counter-form-fitting contour on the drive housing part or handle housing part. In the case of the hand-held power tool, however, it is preferably provided that multiple rotational form-fitting contours and/or multiple rotational counter-form-fitting contours are each engaged with one another in the at least two mounting angular positions in at least two pairs, having an angular distance with respect to the machine longitudinal axis, of rotational form-fitting contour and rotational counter-form-fitting contour.

The hand-held power tool advantageously has at least three, preferably four, rotational form-fitting contours and at least three, preferably four, rotational counter-form-fitting contours, wherein the rotational-form-fitting contours and the rotational counter-form-fitting contours have the same angular distances from one another with respect to the machine longitudinal axis, so that in each of the at least two mounting angular positions, a pair of rotational form-fitting contour and rotational counter-form-fitting contour is engaged with one another. In each of the mounting angular positions, different pairs of rotational form-fitting contour and rotational counter-form-fitting contour can be engaged with one another.

It is preferred if an equal number of rotational form-fitting contours and rotational counter-form-fitting contours are provided in the hand-held power tool. It is advantageous here if, in a respective mounting angular position, each rotational form-fitting contour is engaged with a rotational counter-form-fitting contour.

There are multiple options for designing the rotational form-fitting contours and rotational counter-form-fitting contours.

One preferred concept provides that the handle housing part and the drive housing part each have at least one housing wall which has a contact section that is not circular with respect to the machine longitudinal axis, wherein the contact sections of the housing walls abut one another in the mounted state and prevent the handle housing part and the drive housing part from rotating relative to one another. It is particularly preferred if an opening, for example a step or depression, is arranged on a contact section of one of the housing walls, in which the contact section of the other housing wall engages in a form-fitting manner in the mounted state.

It is possible, for example, that on the handle housing part and the drive housing part, in particular on the outer walls and/or side walls of the handle housing part and the drive housing part, have flattened areas or flat sections are provided, which abut one another in the mounted state and prevent the handle housing part from rotating with respect to the drive housing part. For example, peripheral walls of the handle housing part and the drive housing part, which abut one another in one of the mounting angular positions and hold the handle housing part rotationally fixed with the drive housing part with respect to the mounting angular position, have flattened areas or flat sections.

It is advantageously provided that the at least one rotational form-fitting contour comprises a radial form-fitting projection extending radially to the machine longitudinal axis and the at least one rotational counter-form-fitting contour comprises a radial form-fitting receptacle extending radially to the machine longitudinal axis and/or the at least one rotational form-fitting contour comprises a radial form-fitting receptacle extending radially to the machine longitudinal axis and the at least one rotational counter-form-fitting contour comprises a radial form-fitting projection extending radially to the machine longitudinal axis. It is possible that in a pair of rotational form-fitting contour and rotational counter-form-fitting contour, the rotational form-fitting contour extends radially outward from the machine longitudinal axis, while the rotational counter-form-fitting contour, into which the rotational form-fitting contour engages in one of the mounting angular positions, extends radially inward with respect to the machine longitudinal axis. It is also possible that the rotational counter-form-fitting contour of a pair of rotational form-fitting contour and rotational counter-form-fitting contour extends radially outward with respect to the machine longitudinal axis and the rotational form-fitting contour extends radially inward with respect to the machine longitudinal axis. Both of the above-mentioned measures are possible in combination, i.e., that, for example, the drive housing part has as rotational form-fitting contours a rotational form-fitting contour extending radially outward with respect to the machine longitudinal axis and a rotational form-fitting contour extending radially inward with respect to the machine longitudinal axis and/or the handle housing part has a rotational counter-form-fitting contour extending radially outward with respect to the machine longitudinal axis and a rotational counter-form-fitting contour extending radially inward with respect to the machine longitudinal axis. For example, the rotational form-fitting contours and the rotational counter-form-fitting contours are arranged on the above-mentioned passage openings of the drive housing part and the handle housing part and protrude radially inward toward the respective passage opening or extend radially outward away from the respective passage opening.

A preferred concept provides that the at least one radial form-fitting projection protrudes in front of the flange projection and/or the at least one radial form-fitting receptacle is designed as a depression on the flange receptacle.

Advantageously, it is provided that the hand-held power tool has first and second rotational form-fitting contours which, in at least one of the at least two different mounting angular positions, engage with first and second rotational counter-form-fitting contours, wherein the first rotational form-fitting contours and the second rotational form-fitting contours are arranged one behind the other along a geometric line that is radial with respect to the machine longitudinal axis at first and second radial distances that are different from one another in relation to the machine longitudinal axis. The first and second rotational counter-form-fitting contours have radial distances from the machine longitudinal axis that correspond to these first and second radial distances.

It can be provided that the handle housing part or the drive housing part or both are in one piece, at least in the area of the form-fitting contours and counter-form-fitting contours. For example, the handle housing part and/or the drive housing part can have a cylindrical shape in the area of the counter-form-fitting contours or form-fitting contours.

However, one preferred concept provides that at least one of the handle housing part or the drive housing part is formed from at least two partial housing elements, in particular housing shells, which are fixedly connected to one another in the mounted state in a materially-bonded manner and/or by means of assembly means, in particular screws and/or detent contours, and that form the respective handle housing part or drive housing part, wherein the counter-form-fitting contour of the handle housing part and the form-fitting contour of the drive housing part can be engaged with one another by the mounting of the partial housing elements on one another, in particular by a joining movement of the partial housing elements transversely to the machine longitudinal axis. Therefore, in this configuration, the drive housing part or handle housing part formed from partial housing elements and preassembled is not mounted on the handle housing part or drive housing part, wherein the form-fitting contour and counter-form-fitting contour are engaged with one another, but rather the form-fitting contour and counter-form-fitting contour are fixedly connected to one another by the assembly of the partial housing elements.

If the partial housing elements are connected to one another by means of the assembly means, for example one or more screws, the handle housing part and the drive housing part are connected to one another so they are bidirectionally non-rotatable with respect to the machine longitudinal axis or are rotationally fixed in opposite directions of rotation and/or held together so that they are axially immovable with respect to the machine longitudinal axis.

The assembly means, for example the screws, are advantageously designed to fix the partial housing elements on one another transversely to the machine longitudinal axis. For example, the assembly means comprise screw receptacles on the partial housing elements, for example at least one passage opening on one partial housing element and at least one screw-in opening aligned with this, for example a bore or a blind hole, on the other partial housing element.

It is particularly preferred if the counter form-fitting contour and the form-fitting contour can exclusively be engaged with one another by mounting the partial housing elements on one another.

For example, the partial housing elements can only be removed from one another when the assembly means, for example the screws, are loosened.

It is preferably provided that at least one of the handle housing part or drive housing part is designed as a one-piece cylindrical housing body or has a cylindrical housing body, either completely or at least in the area of the counter-form-fitting contour or form-fitting contour. For example, the counter-form-fitting contour or the form-fitting contour are arranged on the end face of the cylindrical housing body.

It is advantageous if at least one electrical control component for activating the drive motor, in particular an energizing device and/or a switch actuatable by an operator, in particular arranged on the grip section, for switching on and/or for influencing a speed of the drive motor, is arranged on the handle housing part. Multiple electrical control components can be arranged on the handle housing part. The energizing device in particular comprises a bridge circuit. The energizing device is preferably designed for three-phase energizing of the drive motor. The drive motor is preferably an electronically commutated motor or EC motor.

The handle housing part advantageously has a rod-like shape and/or a shape that is elongated with respect to the machine longitudinal axis.

The handle housing part can protrude from the drive housing part in the manner of an arm.

In the hand-held power tool, it is advantageously provided that the handle housing part has a power supply connection, in particular a network cable, for the electrical power supply of the hand-held power tool on a side facing away from the drive housing part. However, the electrical power supply connection can also have a connection interface for connecting an electrical energy storage module, for example a battery pack. The grip section of the handle housing part is advantageously located between the electrical power supply connection and the drive housing part.

The alignment of the connection interface for an electrical energy storage device and thus also the alignment of the electrical energy storage module itself can also be adjustable in the various mounting angular positions. The connection interface for the electrical energy storage module has, for example, electrical contacts for establishing electrical connections between the hand-held power tool and the energy storage module and/or mechanical fastening means, for example detent contours, guide contours, or the like, for detachably fastening the energy storage module.

It is advantageously provided that a power supply connection for connecting the hand-held power tool to an electrical power supply network by means of a network cable is arranged on the handle housing part, wherein a cable grommet for guiding the network cable away from the machine housing along a grommet longitudinal axis of the cable grommet is arranged on the power supply connection, and wherein the cable grommet is held in a grommet receptacle of a grommet holder on the machine housing.

The grommet longitudinal axis can be aligned with the machine longitudinal axis or parallel to the machine longitudinal axis in both mounting angular positions or in all mounting angular positions.

It is preferred if the grommet longitudinal axis has an exit angle of between 2° and 45° in relation to the machine longitudinal axis.

It is advantageously provided that the grommet holder is arranged and/or held and/or formed between opposite partial housing elements of the machine housing. The partial housing elements are preferably those which have already been described. Two partial housing elements are advantageously provided, in particular in the form of half shells. The grommet holder can be arranged, for example, on the partial housing elements or on one of the partial housing elements.

It is advantageously provided that the cable grommet is fixable on the grommet receptacle and/or the machine housing in at least two exit angles different from one another with respect to the tool holder and/or with respect to the machine longitudinal axis. Thus, for example, the grommet longitudinal axis can be fixable in two or more exit angles relative to the machine longitudinal axis on the grommet receptacle or can be held on the grommet receptacle.

For example, the exit angle is predetermined by a correspondingly angled design of the cable grommet, which has a cable section for receiving the cable and a mounting section for mounting on the grommet receptacle, which are angled to one another at the exit angle. The mounting section of the angled cable grommet can, for example, be held on the grommet receptacle in at least two different rotational positions with respect to its longitudinal axis or the machine longitudinal axis, so that the cable section thus protrudes in front of the grommet receptacle in different directions at the respective exit angle. It is also possible that due to a cable grommet in which the mounting section and the cable section are angled to one another, by relative rotation of the cable grommet on the grommet holder or grommet receptacle, the relative position and/or angular position of the grommet longitudinal axis to the machine longitudinal axis and/or or the tool holder is identical or essentially the same in the at least two mutually different mounting angular positions of the handle housing part with respect to the drive housing part.

An advantageous measure provides that the cable grommet is fixable on the grommet receptacle and/or the machine housing in the same relative position and/or angular position of the grommet longitudinal axis with respect to the tool holder in the at least two mutually different mounting angular positions of the handle housing part with respect to the drive housing part. Thus, for example, the exit angle of the cable grommet or the grommet longitudinal axis of the cable grommet with respect to the tool holder can be retained, even if the handle housing part is connected to the drive housing part in the different mounting angular positions.

This measure can be achieved, for example, by using different grommet holders for the respective mounting angular positions, wherein the grommet holder forms a first grommet holder having first grommet holder bodies and has a second grommet holder having second grommet holder bodies that form or have a grommet receptacle for holding the cable grommet, wherein the grommet receptacles of the first grommet holder and the second grommet holder hold the cable grommet at different exit angles with respect to the machine longitudinal axis.

The handle section is preferably designed as a grip section that is provided for an operator to grasp. The operator can therefore grasp the grip section with one hand, for example in order to guide and/or hold the hand-held power tool.

It is advantageous if a protective body is opposite to the handle section, wherein a reach-through opening is formed between the protective body and the handle section for an operator to reach through when grasping around the grip section. A reach-through opening is advantageously provided between the grip section and the protective body.

One or more drive components can be provided in the drive housing part. It is preferred if the drive housing part has the drive motor and/or gear arranged between the drive motor and the tool holder and drivable by the drive motor. The gear comprises, for example, a reduction gear for reducing the speed of the drive motor and/or an angular gear, so that an axis of rotation of the tool and an axis of rotation of the drive motor can be angled to one another.

It is preferred if the tool holder is rotationally drivable around an axis of rotation by the drive motor, wherein the axis of rotation and the machine longitudinal axis are angled to one another, in particular at right angles. Then, for example, the above-mentioned angular gear is provided, which is preferably accommodated in the drive housing part. At this point it is to be noted that the drive housing part can also be in several parts, i.e., that it has, for example, a housing section or a housing part on which the form-fitting contour for mounting and fastening the handle housing part is arranged and another housing part, in which, for example, a gear or the gear which is arranged between the drive motor and the tool holder can be arranged.

In principle, the handle section can form the only handle of the hand-held power tool. However, it is preferred if at least one handle, in particular a handle bracket, is arranged on the machine housing, in particular the drive housing part. A grip section of the handle preferably extends transversely to the machine longitudinal axis of the handle housing part.

The above-mentioned handle is preferably mounted adjustably, in particular pivotably by means of a pivot bearing and/or while maintaining the alignment of its grip section, on the machine housing, in particular the drive housing part, and fixable in place with respect to the machine housing by a fixing device. The fixing device comprises, for example, a clamping device, detent device, or the like. In particular, a clamping screw is provided.

Furthermore, it is advantageous if the hand-held power tool is produced or producible as part of a modular system. A modular system for producing a hand-held power tool according to the above description or according to the invention is preferably provided, wherein by means of the modular system, a second hand-held power tool different from this hand-held power tool is also producible by means of the same handle housing part, wherein the modular system has at least two different drive housing parts, has form-fitting contours matching the counter-form-fitting contours, and on which the handle housing part is mountable, in particular in the at least two mounting angular positions, to produce the respective hand-held power tool. The drive housing parts comprise, for example, different drive motors and/or different gears. Furthermore, the so-called first hand-held power tool according to the above description and the at least one further hand-held power tool can be power tools of different types. For example, one hand-held power tool can be designed as a grinding machine, while the other hand-held power tool is designed as a cutting machine. The hand-held power tools can also have different protective devices, for example cover hoods, for their respective work tools. It is also possible that different work tools, for example cutting tools, grinding tools, or the like, are mountable on the tool holders of the hand-held power tools of the modular system. Electrical and/or electric components arranged in the handle housing part, for example switches, an energizing device for the drive motor, etc., can be connectable in the modular system to drive components, for example electric drive motors and/or gears, of at least two different drive housing parts to produce hand-held power tools.

The hand-held power tool is preferably a grinding machine, cutting machine, or the like. It is true that a grinding machine or cutting machine is explained in the following description. However, the hand-held power tool can also readily be a saw or sawing machine, a milling machine, or the like.

The work tool is preferably a disk-shaped tool. The hand-held power tool or power tool is designed in particular to hold a disk-shaped work tool on the tool holder.

A protective hood or protective cover is expediently provided on the tool holder or in the area of the tool holder. The protective cover preferably extends over a flat side of the disk-shaped work tool. It is possible that the protective cover covers an outer peripheral area of the work tool.

Furthermore, it is advantageous if the power tool has a dust removal connection to which a suction hose or a dust collection container is connectable. The dust removal connection comprises, for example, a suction connection for a suction hose. A suction hose or a dust collection container, for example, is pluggable onto a plug section of the dust removal connection. The dust removal connection preferably has a tubular body.

BRIEF DESCRIPTION OF THE DRAWINGS

Exemplary embodiments of the invention are explained below with reference to the drawing. In the figures:

FIG. 22 shows a cross section through the dust protection device according to FIG. 21, approximately along a section line B-B, which is drawn in the dust protection device according to FIG. 20, FIG. 23 shows a detail D1 from FIG. 22;

FIG. 24 shows a detail D2 of the dust protection device according to FIG. 20, wherein the detail approximately corresponds to detail D1 and thus a partial section along section line B-B of the dust protection device according to FIG. 20, FIG. 26 shows a section through a base mold and a closure mold during the production of the dust protection device according to FIG. 22 approximately along a section line C-C through the base mold shown in FIG. 25, FIG. 27 shows a section through a base mold and a closure mold during the production of the dust protection device according to FIG. 20 approximately along a section line C-C through the base mold shown in FIG. 25.

DETAILED DESCRIPTION OF THE PREFERRED EMBODIMENTS

Figure 1:
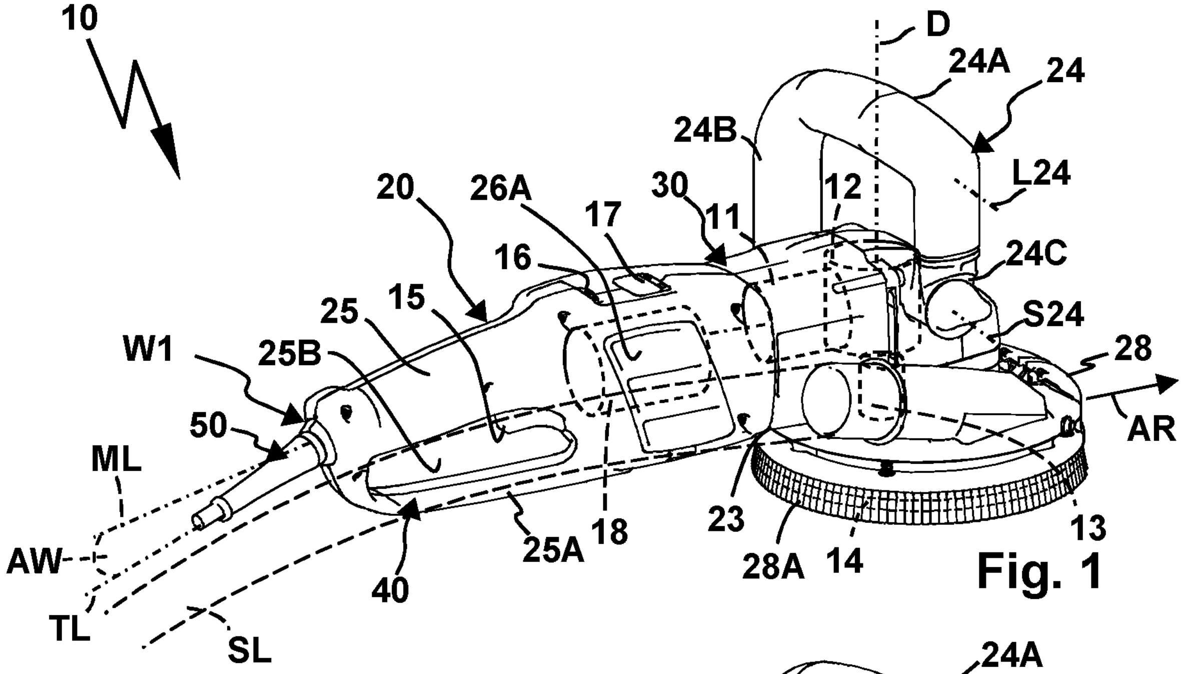
FIG. 1 shows a perspective oblique view of a hand-held power tool having a handle housing part in a first mounting angular position with respect to a drive housing part of the hand-held power tool.

A hand-held power tool 10 is designed as a grinding machine, for example. The hand-held power tool 10 has a drive motor 11 which, via a gear 12, for example an angular gear and/or reduction gear, drives a tool holder 13 for driving a work tool 14, for example a grinding tool or cutting tool, in particular a disk-shaped tool. The drive motor 11 can be switched on or off using a switch 15, for example a pressure switch. A speed sensor 16 is also provided, using which a speed, for example a maximum speed or a nominal speed, of the drive motor 11 is settable. A display 17 is used to display operating states of the hand-held power tool 10.

An energizing device 18 is activatable by means of the speed sensor 16 and the switch 15. The energizing device 18 has, for example, power-electronics switching elements, in particular a bridge circuit, for energizing the drive motor 11. The drive motor 11 is preferably an electric motor, in particular an electronically commutated motor.

The drive motor 11, the gear 12, the switch 15, the speed sensor 16, the display 17, and the energizing device 18 are accommodated in a machine housing 20 of the hand-held power tool and protected thereby.

The tool holder 13 is located on a front longitudinal end area 21 of the machine housing 20 in the working direction AR. The machine housing 20 has a longitudinal shape and extends between the front longitudinal end area 21 and a rear longitudinal end area 22 along a machine longitudinal axis ML.

A drive housing part 30 and a handle housing part 40 of the machine housing 20 are arranged one behind the other along the machine longitudinal axis ML and are connected to one another by means of a mounting interface 23. The handle housing part 40 protrudes from the drive housing part 30 in the direction of the machine longitudinal axis ML.

The longitudinal axis ML of the machine is angled, in the present case at right angles, to an axis of rotation D around which the tool holder 13 is rotationally drivable by means of the drive motor 11 and the gear 12.

The drive motor 11 and the gear 12 are accommodated in the drive housing part 30. The drive housing part 30 comprises a drive housing body 35C, in which the drive motor 11 is essentially accommodated, and a housing body 38 which is fastened to the drive housing body 35C by means of screws 39 and which could also be referred to as a gear housing. The housing body 38 forms, so to speak, the front longitudinal end 21 of the machine housing 20.

The energizing device 18 and the switch 15 and the speed sensor 16 are arranged in the handle housing part 40.

A handle 24 is arranged on the drive housing part 30, the handle section 24A of which extends along a handle axis L24. The handle axis L24 extends transversely to the machine longitudinal axis ML, preferably transversely at right angles.

The handle 24 is mounted to be pivotable around a pivot axis S24 with respect to the machine housing 20 by means of a pivot bearing 24C. The pivot axes S24 and the machine longitudinal axis ML are angled to one another, for example at right angles. The pivot axis S24 and the handle axis L24 preferably extend in parallel to one another, wherein angular positions of these axes relative to one another are readily possible. In any case, an alignment of the handle axis L24 with respect to the machine housing 20 is maintained even when pivoting around the pivot axis S24.

Side legs 24B protrude at angles from the handle portion 24A, which are connected to the machine housing 20 by means of the pivot bearing 24C.

A fixing device 24D is provided to fix the handle 24 in a stationary manner with respect to the machine housing 20. When the fixing device 24D is released, the handle 24 can be pivoted by means of the pivot bearing 24C, while the handle 24 is fixed with respect to the machine housing in the fixing position of the fixing device 24D. For example, the fixing device 24D comprises a clamp screw 24E having a handle that can be grasped by an operator.

The handle 24 is used to grasp the hand-held power tool 10 at its front end area 21.

Another grip section 25 is used to grasp the hand-held power tool 10 at its rear end area 22.

The grip section 25 is arranged, for example, on the handle housing part 40. The grip section is oriented in the direction of the machine longitudinal axis ML and is thus angled to the handle section 24A, for example at right angles.

A protective body 25A is located opposite to the grip section 25, so that a reach-through opening 25B is formed between the grip section 25 and the protective body 25A. At the rear longitudinal end area 22 and at an area facing toward the drive housing part 30, the grip section 25 and the protective body 25A are connected to one another by means of a connecting section 40V of the handle housing part 40, so that the reach-through opening 25B is closed at its longitudinal end areas.

A housing section 40G of the handle housing part 40 extends between the grip section 25 and the drive housing part 30, on which cooling air openings 26A, 26B and an operating area 27 are arranged. The operating area 27 is arranged between the cooling air openings 26A, 26B. The operating area 27 and the cooling air openings 26A, 26B are arranged on housing walls of the handle housing part 40 which are angled to one another, the operating area 27 on an upper wall 40C and the cooling air openings 26A, 26B on side walls 40A and 40B which are angled to the wall 40C.

The grip section 25 extends as part of the upper wall 40C from the operating area 27 and as a continuation of the side walls 40A and 40B to the rear longitudinal end area 22. Rear sections 40E of the side walls 40A and 40B extending between the operating area 27 and the connecting section 40V form side legs of the grip section 25. Rear sections 40F of the side walls 40A and 40B extending between the operating area 27 and the connecting section 40V form side legs of the protective body 25A.

A rear section 40E of a wall 40D opposite to the upper wall 40C forms a wall section of the protective body 25A. Thus, the protective body 25A is connected to or comprises a part of the lower wall 40D, while the grip section 25 is connected to or comprises a part of the upper wall 40C.

An angular position of the grip section 25 with respect to the machine longitudinal axis ML and thus with respect to the handle axis L24 of the front handle 24 is relevant for the ergonomics and operation of the hand-held power tool 10.

Furthermore, the ergonomic qualities of the hand-held power tool 10 are also influenced by the position of the handle 25 in relation to a suction hose SL, which is connectable to a dust removal connection 29.

Using the dust removal connection 29 and/or via the dust removal connection 29, dust that accumulates during operation of the hand-held power tool can be conveyed away from the work tool 14, for example into a dust collection container or, as in the exemplary embodiment, to a vacuum cleaner (not shown) that is connected to the suction hose SL.

The dust removal connection 29 comprises a connection section 29A, designed as a plug section, for example, to which the suction hose SL is connectable. The dust removal connection 29 has a dust removal connection longitudinal axis S, which at the same time forms a plug axis of the connection section 29A. The dust removal connection longitudinal axis S of the dust removal connection predetermines an extension direction next to the machine housing 20 for the suction hose SL, so that the suction hose SL connected to the dust removal connection 29 extends essentially in parallel to the machine longitudinal axis ML from the front longitudinal end area 21 in the direction of the rear longitudinal end area 22 next to the machine housing 20 when it is connected to the dust removal connection 29.

The dust removal connection 29 is arranged on a protective cover 28 for covering the work tool 14.

The protective cover 28 is designed, for example, as a suction hood that can cover the work tool 14. A brush or similar other resilient support device 28A is preferably arranged on a side edge covering an outer periphery of the work tool 24 and/or on a free end region of the protective cover 28 to rest on an underlying surface over which hand-held power tool 10 can be guided.

The respectively suitable or desired angular position can be achieved by the mounting of the machine housing 20 explained below.

Figure 2:
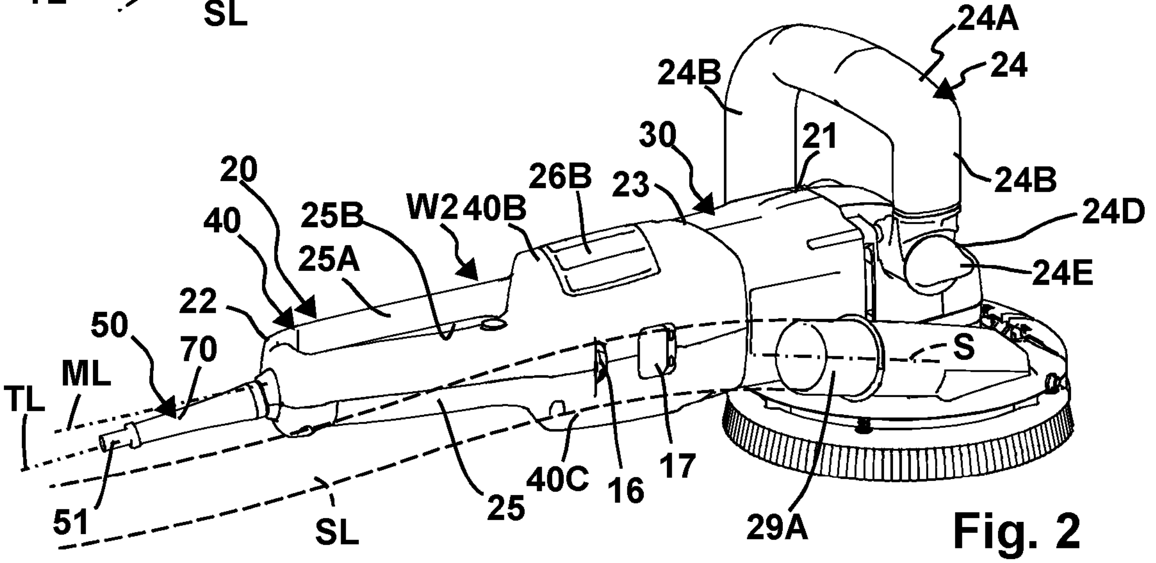
FIG. 2 shows the hand-held power tool according to FIG. 1, but having the handle housing part in a second mounting angular position.

The handle housing part 40 can be mounted on the drive housing part 30 in mounting angular positions W1 and W2 shown as examples with respect to the machine longitudinal axis ML (FIGS. 1 and 2).

The handle housing part 40 comprises partial housing elements 45A, 45B, which form the handle housing body 45C and are mountable in a form-fitting manner on the drive housing body 35C of the drive housing 40 in the form of a cylindrical housing body 35 in the respective mounting angular positions W1 and W2. The drive housing body 35C is arranged between the housing body 38 and the handle housing part 40.

For the form-fitting fastening of the handle housing part 40 and the drive housing part 30 to one another, a form-fitting contour 32 is fixedly arranged on the housing body 35 and thus on the drive housing part 30, and a counter-form-fitting contour 42 is fixedly arranged on the handle housing part 40, in particular its partial housing elements 45A, 45B. The form-fitting contours 32, 42 form integral components of the drive housing body 35C and the handle housing body 45C and are, for example, produced in one piece with their side walls, in particular as part of a casting process or injection molding process.

At the mounting interface 23, the drive housing part 30 and the handle housing part 40 are opposite to one another with passage openings 31, 41, so that interior spaces of the two housing parts 30 and 40 communicate with one another and components that are arranged in the drive housing part 30, for example the drive motor 11 and the gear 12, are electrically and mechanically connectable or connected to components that are arranged in the handle housing part 40, for example the energizing device 18, for example the drive motor 11 to the energizing device 18.

The form-fitting contour 32 comprises an axial form-fitting contour 33 in the form of a flange receptacle 33A, which extends around the passage opening 31. A flange projection 43A of an axial counter-form-fitting contour 43 of the counter-form-fitting contour 42 engages in the flange receptacle 33A in a form-fitting manner. The drive housing part 30 and the handle housing part 40 are connected or connectable to one another with high tensile strength with respect to the machine longitudinal axis ML by the axial form-fitting contour 33 and the axial counter-form-fitting contour 43.

A rotational form-fitting contour 34 or multiple rotational form-fitting contours 34 of the form-fitting contour 32, into which the rotational counter-form-fitting contours 44 of the counter-form-fitting contour 42 engage in a form-fitting manner, are used for the rotationally-fixed mounting and fixing of the handle housing part 40 with respect to the machine longitudinal axis ML on the drive housing part 30. The rotational form-fitting contours 34 comprise, for example, radial form-fitting receptacles 34A that extend from the flange receptacle 33A into the passage opening 31 and/or radially inward with respect to the machine longitudinal axis ML. Radial form-fitting projections 44A of the rotational counter-form-fitting contours 44 engage in therein a form-fitting manner. For example, the radial form-fitting receptacles 34A and the radial counter-form-fitting projections 44A have a trapezoidal or triangular shape.

The radial counter-form-fitting projections 44A protrude in front of the flange projection 43A, for example.

The passage openings 31, 41 are delimited by housing walls 37 and 47 of the drive housing part 30 and the handle housing part 40. The passage openings 31, 41 are arranged on end walls 36, 46 of the drive housing part 30 and the handle housing part 40. For example, the passage opening 41 is peripherally delimited by the flange projection 43A, which is arranged or formed on the end wall 46. The passage opening 31 passes through the end wall 36 on which the flange receptacle 33A is formed.

A flange projection 33C is opposite to the end wall 36, so that the flange receptacle 33A is formed between the flange projection 33C and the end wall 36.

Peripheral walls 37 and 47 of the drive housing part 30 and the handle housing part 40 formed by the partial housing elements 45A, 45B are flush with one another when the machine housing is fully assembled. The peripheral walls 37 and 47 have contact sections 37A, 47A which abut one another in the mounted state of the machine housing 20. Flat sections 37C, 47C of the peripheral walls 37 and 47 abut one another in this case. Furthermore, corner areas 37D and 47D of the peripheral walls 37 and 47, which extend between the flat sections 37C and 47C, also abut one another, so that the abutting peripheral walls 37 and 47 also form anti-twist contours that prevent the handle housing part 40 from rotating in relation to the drive housing part around the machine longitudinal axis ML in the mounted state of the machine housing 20.

In addition, the flat sections 37C and 47C form, for example, second rotational form-fitting contours and second counter-rotational form-fitting contours, which have greater distances in relation to the machine longitudinal axis ML than the rotational form-fitting contours 34 and the counter-rotational form-fitting contours 44, which in this embodiment form first rotational form-fitting contours and first rotational counter-form-fitting contours.

It is preferred if, in the mounted state of the machine housing 20, openings and recesses in the peripheral walls engage in one another, so that the peripheral walls 37 and 47 press tightly against one another in the mounted state of the machine housing 20. For example, an opening 37B, in particular a depression, is provided on the peripheral wall 37, in which a supporting projection or engagement projection 47B of the peripheral wall 47 engages when the form-fitting contours 32 engage with the counter-form-fitting contours 42. At this point it becomes clear that the contact sections 37A, 47A are also components of the form-fitting contours 32 and the counter-form-fitting contours 42.

Figure 4:
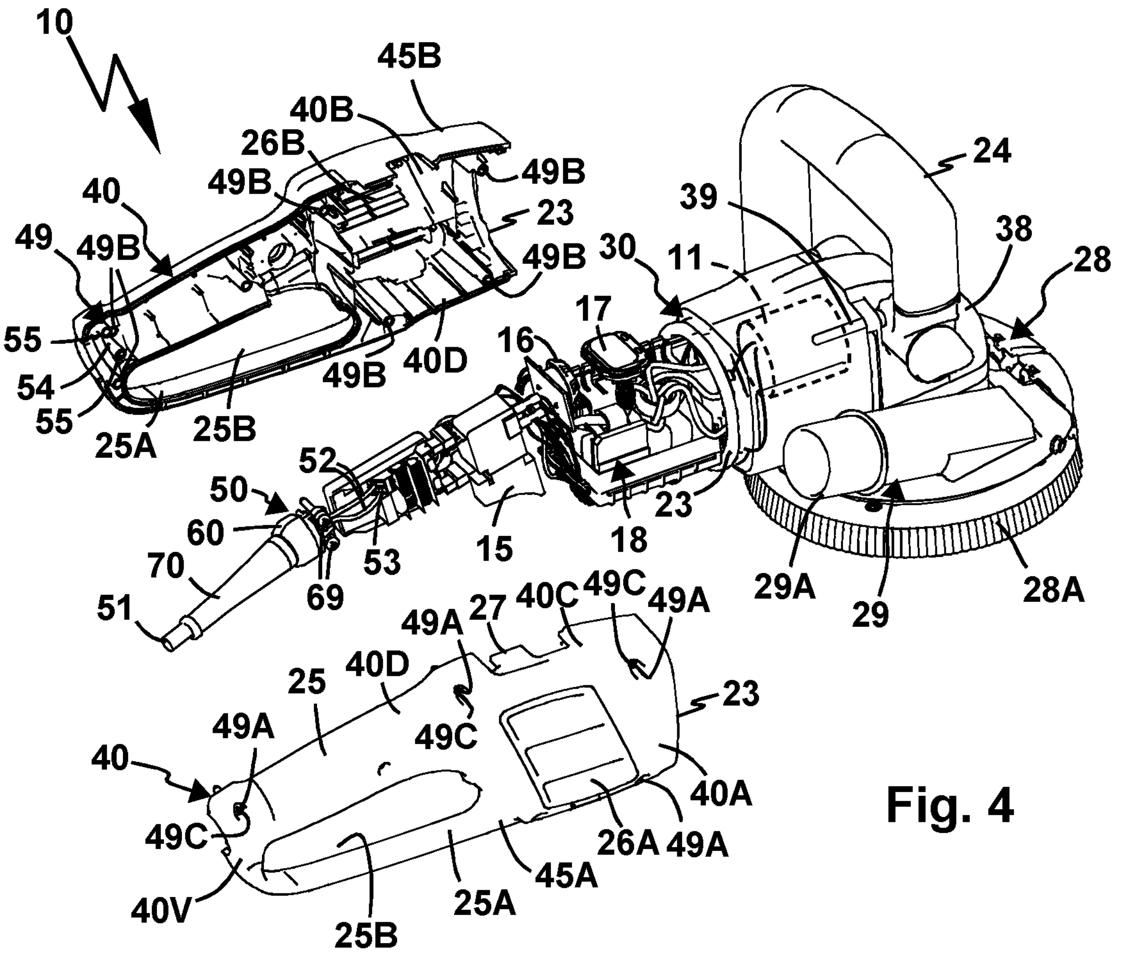
FIG. 4 shows an exploded view of the hand-held power tool according to FIG. 1 or 2.
Figure 5:
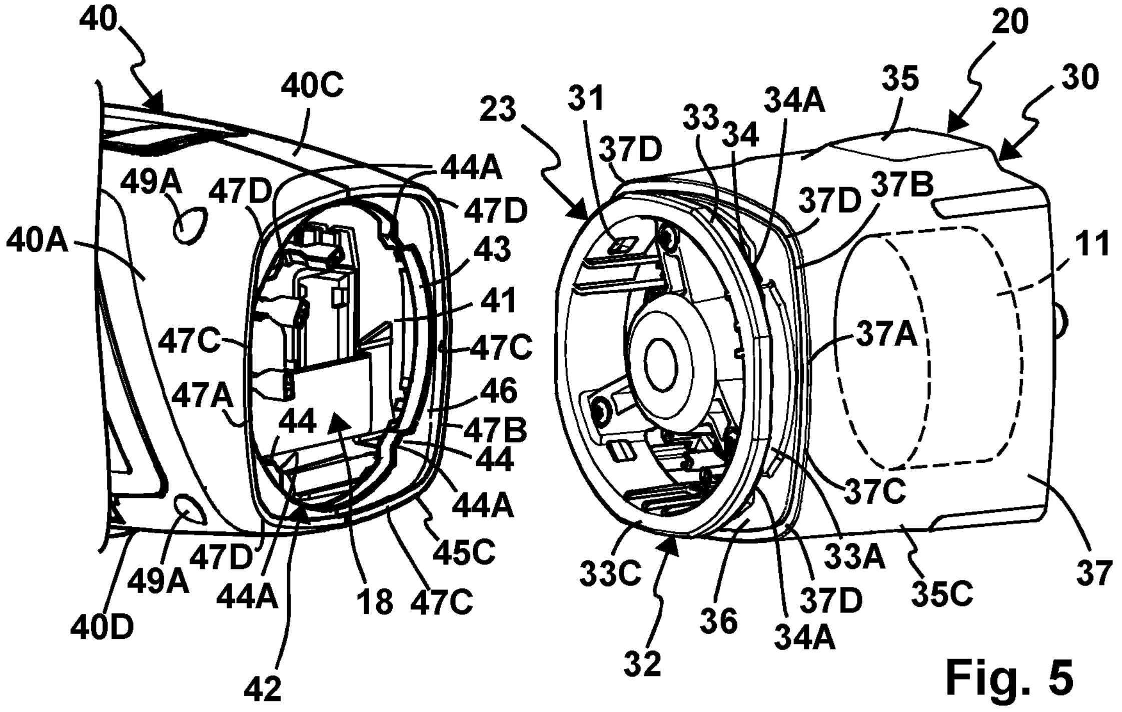
FIG. 5 shows a perspective partial view of the handle housing part and the drive housing part in the non-mounted state.

The mounting of the housing 20 is clear from FIG. 4. The partial housing elements 45A, 45B are joined together transversely to the machine longitudinal axis ML, so that on the one hand they accommodate the components to be accommodated in the interior space of the handle housing part 40, in particular the energizing device 18, and on the other hand the form-fitting contours 32 and the counter-form-fitting contours 42 engage with one another. For example, parts of the flange projection 43A arranged on the partial housing elements 45A, 45B sequentially engage with the flange receptacle 34A on the drive housing body 35C. In addition, the rotational form-fitting contours 34 and rotational counter-form-fitting contours 44, which are rotationally fixed with respect to the machine longitudinal axis ML, engage with one another, so that by fixing the partial housing elements 45A, 45B on one another, the form-fitting contours 32 and 42 are fixedly held together and the drive housing part 30 is fastened to the handle housing part 40 with high tensile strength and anti-twisted with respect to the machine longitudinal axis.

For this fixation, form-fitting fastening means, for example detent elements not shown in the drawing, in particular detent hooks, and/or materially bonded fastening means, for example an adhesively bond or weld of the two partial housing elements 45A and 45B, can be provided. However, an advantageous measure provides that the partial housing elements are connected to one another by assembly means 49. The assembly means 49 comprise screw receptacles 49A, 49B on the partial housing elements 45A, 45B, into which screws 49C can be screwed. For example, the screw receptacles 49A comprise passage openings for inserting the screws 49C, which can be screwed into the screw receptacles 49B, which are designed, for example, as blind holes and/or as screw bosses and/or have screw threads.

The handle housing part 40 and the drive housing part 30 are thus fixedly connected to one another and the hand-held power tool 10, in particular its machine housing 20, optimally withstands the loads occurring during operation.

Figure 6:
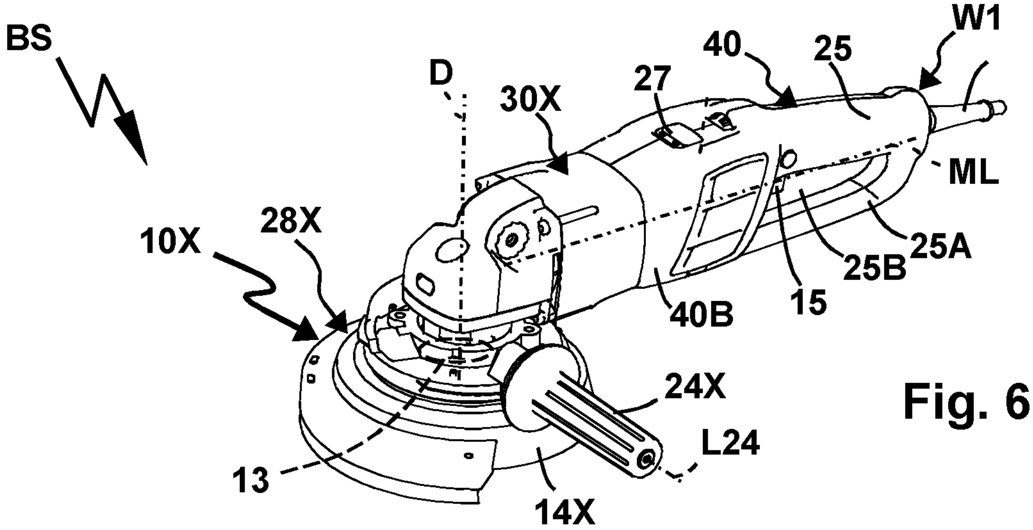
FIG. 6 shows a second hand-held power tool in the form of a cutting grinder having the handle housing part of the hand-held power tool according to FIGS. 1-5.
Figure 7:
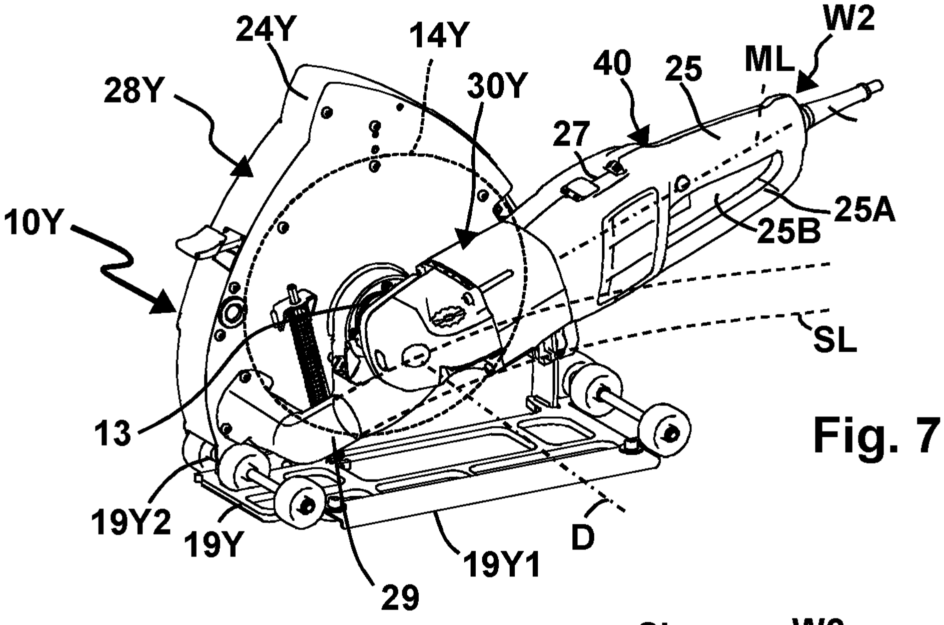
FIG. 7 shows a perspective oblique view of a third hand-held power tool in the form of a cutting machine having the handle housing part of the hand-held power tool according to FIGS. 1-5.
Figure 8:
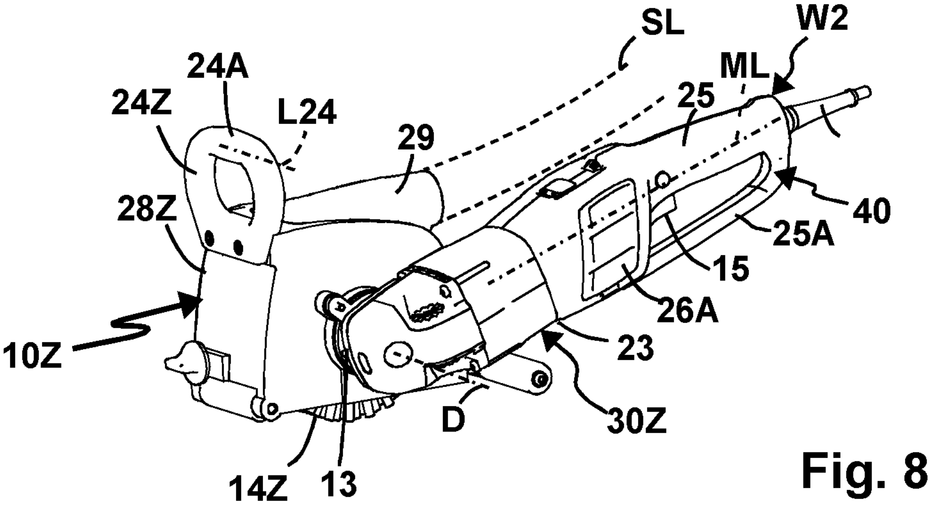
FIG. 8 shows a perspective oblique view of a fourth hand-held power tool in the form of a brushing machine having the handle housing part of the hand-held power tool according to FIGS. 1-5.
Figure 9:
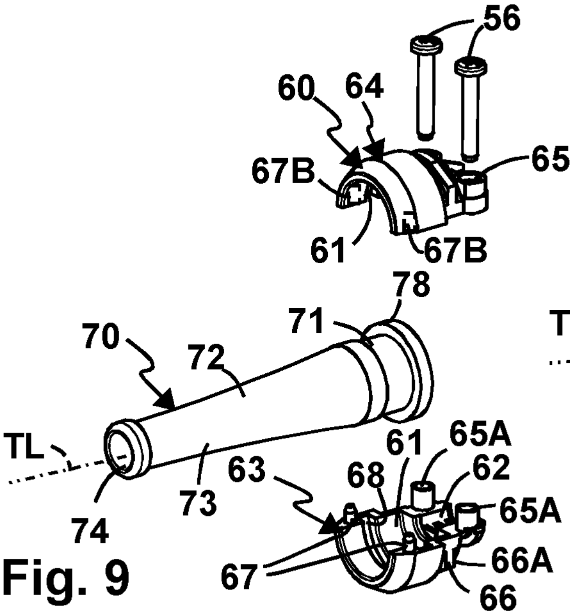
FIG. 9 shows an exploded view of a power supply connection of the hand-held power tool according to the above figures with an orientation angled with respect to a machine longitudinal axis of the hand-held power tool.
Figure 10:
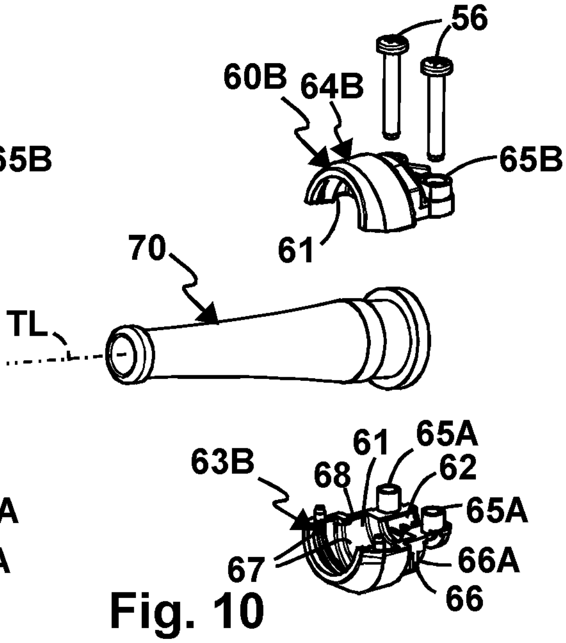
FIG. 10 shows an exploded view of an alternative power supply connection for the hand-held power tool having orientation in parallel to the machine longitudinal axis.
Figure 11:
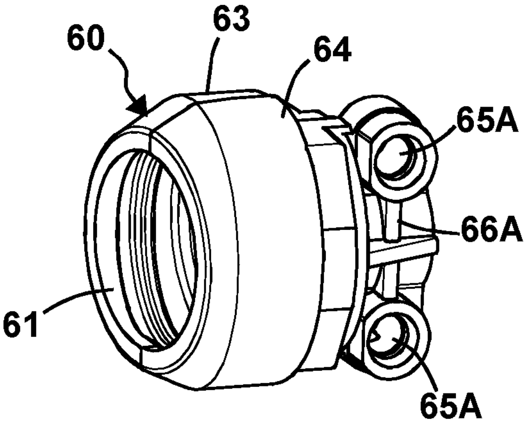
FIG. 11 shows a perspective oblique view of a grommet holder obliquely from the front.
Figure 12:
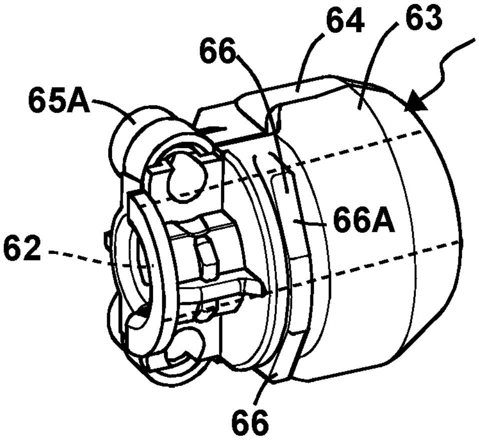
FIG. 12 shows the grommet holder according to FIG. 11, but obliquely from the rear.
Figure 13:
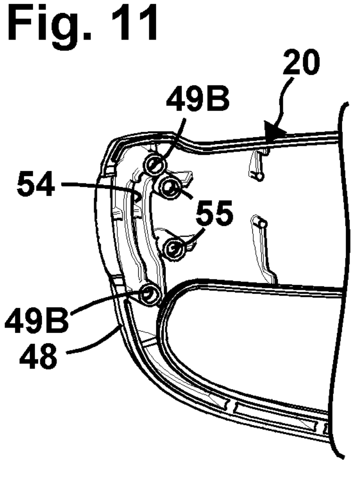
FIG. 13 shows an open section of a machine housing of the hand-held power tool according to FIGS. 1-5 at the rear in the working direction.
Figure 14:
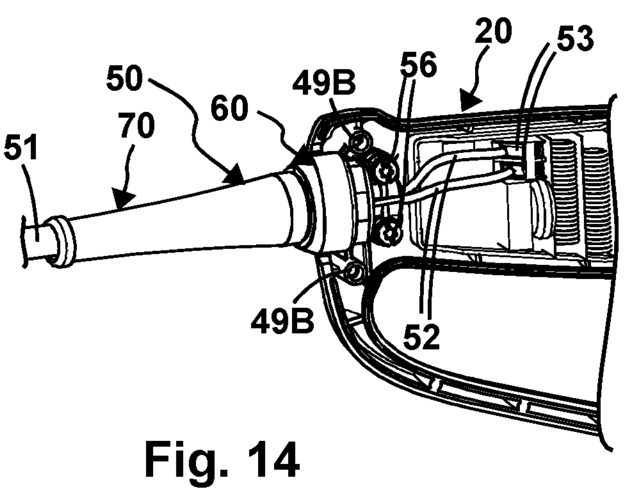
FIG. 14 shows the view according to FIG. 13, wherein components of the power supply connection according to FIG. 9 are mounted.
Figure 15:
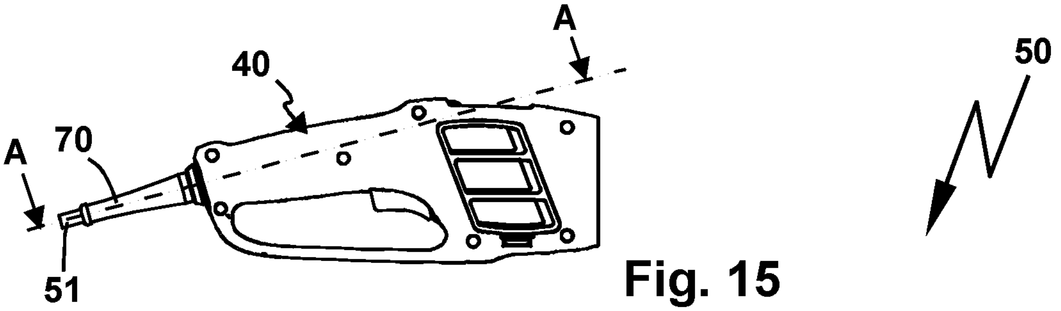
FIG. 15 shows a side view of a rear section of the machine housing of the hand-held power tool according to the preceding figures having the power supply connection.
Figure 17B:
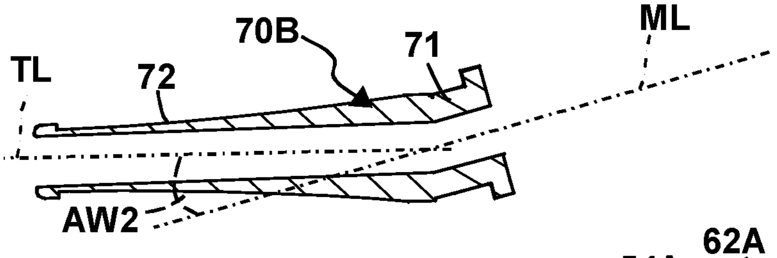
FIG. 17B shows a cross section through a schematically shown cable grommet, corresponding to the section line of FIGS. 16 and 17.

The angle-optimized assembly of drive housing part and handle housing part, so to speak, which is selectable for the respective application, can also be implemented in other machine concepts, which becomes clear from FIGS. 6, 7, 8.

Hand-held power tools 10X, 10Y, 10Z are shown there, each of which has the handle housing part 40 already explained.

This handle housing part 40 is mounted on different drive housing parts 30X, 30Y and 30Z, each of which has the mounting interface 23 and in which the drive motor 11 and optionally the gear 12 are arranged in each case. The gear 12 and the drive motor 11 can be designed for the same or different speed ranges, outputs, and the like in the hand-held power tools 10, 10X, 10Y, 10Z.

It is possible that one or more of the components arranged in the handle housing part 40, for example the switch 15, the speed sensor 16, the display 17, and the energizing device 18, are used in the hand-held power tools 10X, 10Y, 10Z. However, it is also possible that one or more of these components are designed alternatively, i.e., for example an energizing device 18 having different power values is used.

The hand-held power tools 10, 10X, 10Y, 10Z form a modular system BS.

Insofar as previously described components are present in the hand-held power tools 10X, 10Y and 10Z, they have the same or similar reference numbers as in the hand-held power tool 10, wherein the reference numbers are provided with the letters X, Y and Z in some cases to differentiate between different features.

The hand-held power tool 10X is, for example, an angle grinder whose work tool 14X is designed as a cutting disk. The work tool 14X is arranged under a protective cover 28X. A handle 24X protrudes transversely from the drive housing part 30X in the region of the tool holder 13, so that its handle axis L24 extends transversely to the machine longitudinal axis ML. In the exemplary embodiment, the handle housing part 40 is fastened and mounted on the drive housing part 30X at the mounting angular position W1 so that the handle axis L24 extends transversely to a plane in which the grip section 25 and the supporting body 25A lie. In the mounting angular position W2, in which the drive housing part 30X and the handle housing part 40 are mountable to one another, this plane can be parallel to a plane in which the handle axis L24 extends.

The hand-held power tool 10Y is, for example, a cutting machine, for example for producing wall slots or the like. A work tool 14Y, which is detachably fastenable to the tool holder 13 of the hand-held power tool 10Y, is designed, for example, in the manner of a saw blade or a cutting disk. The work tool 14Y is arranged under a protective cover 28Y, which can be grasped at its outer periphery by an operator to guide the hand-held power tool 10Y. The protective cover 28Y thus forms a handle 24Y of the hand-held power tool 10Y.

The hand-held power tool 10Y has, for example, a guide body 19Y, for example a so-called guide table or guide carriage, the underside of which forms a guide surface 19Y1 that can be placed on an underlying surface and using which the hand-held power tool 10Y can be guided along the underlying surface. The drive housing part 30Y forms part of a drive unit arranged on the protective cover 28Y, which is mounted pivotably with respect to the guide body 19Y by means of a pivot bearing 19Y2 in order to set a plunging depth of the work tool 14Y, with which the work tool 14Y plunges into the underlying surface, for example into a workpiece. For this purpose, too, it is advantageous if an operator can grasp the hand-held power tool 10Y at the handle 25 on the one hand and at the handle 24Y on the other.

The respective ergonomically most favorable position of the handle 25 relative to the handle 24Y and/or the guide surface 19Y1 can already be set during the assembly of the hand-held power tool 10Y by means of the mounting interface 23, wherein a mounting angular position W2 is shown as an example in the drawing. It can readily be advantageous for some applications or users if, on the one hand, the handle 25 and the protective body 25A and, on the other hand, the axis of rotation D lie in mutually parallel planes, wherein then the mounting angular position W1 is established by the mounting of the handle housing part 40 on the drive housing part 30Y.

A brush tool, for example, is arrangeable as a work tool 14Z on the tool holder 13 of the hand-held power tool 10Z. The work tool 14Z is arranged under a protective cover 28Z. A handle 24Z is arranged on the protective cover 28Z, the grip section 24A of which extends along a handle axis L24. The drive housing part 30Z is detachably or permanently fastened to the protective cover 28Z, wherein the axis of rotation D of the tool holder 13 on the one hand and the handle 25 and the protective body 25A on the other hand are in mutually angled, for example right-angled planes. The drive housing part 30Z and the handle housing part 40 are connected to one another, for example, in the mounting angular position W2. The mounting angular position W1 of the drive housing part 30Z and the handle housing part 40 may also be readily produced by means of the mounting interface 23, so that other ergonomic properties result.

The hand-held power tools 10, 10X, 10Y, 10Z can in principle be designed for operation without an electrical supply network, i.e., for example as battery-operated hand-held power tools. In this case, for example, an interface for connecting an electrical energy storage device, for example a battery pack, is provided, for example on the connecting section 40V of the machine housing 20.

However, in the hand-held power tools 10, 10X, 10Y, 10Z, a power supply connection 50 having a network cable 51 is arranged on the connecting section 40V and/or a rear wall 48 of the machine housing 20 at its rear longitudinal end region 22.

The network cable 51 has, for example, conductors 52, for example wires, which are guided in a manner known per se in a sheath or protective sheath. A connector plug 51A for connection to a power supply network N, for example, is provided on a free end area of the network cable 51 that is remote from the hand-held power tool 10.

The network cable 51 is guided into the machine housing 20 by means of a cable grommet 70. The cable grommet 70 has a cable receptacle section 71 for accommodating the network cable 51. The cable receptacle section 51 has a longitudinal shape and extends along a grommet longitudinal axis TL. A cable passage opening 74 of a grommet body 73 of the cable grommet 70 also extends along this grommet longitudinal axis TL, so that the network cable 51 accommodated in the cable passage opening 74 is aligned along the grommet longitudinal axis TL at the outlet of the cable grommet 70 remote from the machine housing 20 and is accordingly guided away from the machine housing 20 in accordance with the longitudinal extension or grommet longitudinal axis TL.

Figure 3:
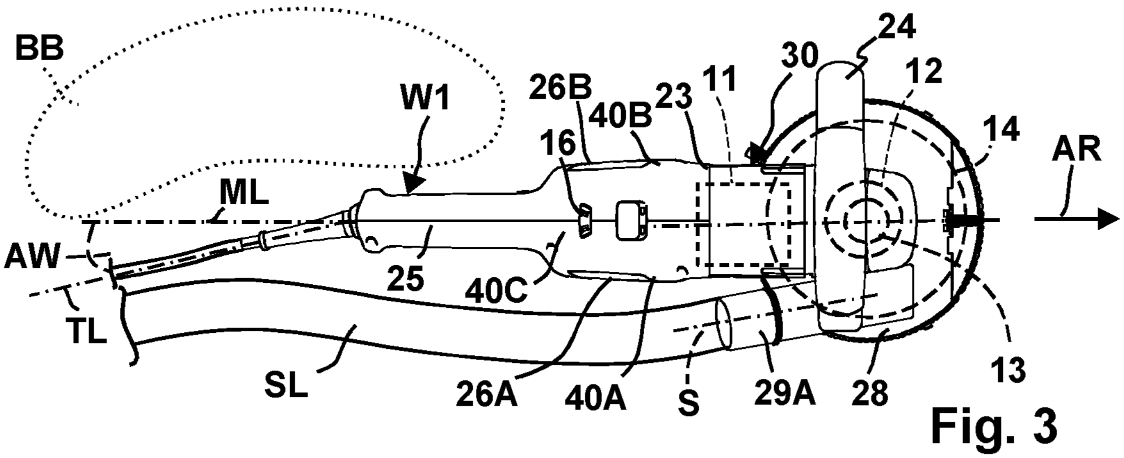
FIG. 3 shows the hand-held power tool according to FIG. 1 from above.

The grommet longitudinal axis TL has an exit angle AW in relation to the machine longitudinal axis ML. It is preferred if the exit angle AW is selected in such a way that the grommet longitudinal axis TL extends away from the machine housing 20 in the direction of the suction hose SL when the latter is fastened on the dust removal connection 29. This situation can be seen particularly well in FIGS. 1-3, for example. The exit angle AW is in relation, for example, to a longitudinal center plane of the machine housing 20 (see FIG. 3), so that a generous operating area BB or work space remains free for an operator next to the grip section 25 of the handle housing part 40. Both the network cable 51 and the suction hose SL are guided away from the operator, who grasps the hand-held power tool 10 with his right hand on the grip section 25, for example.

The exit angle AW is also advantageous in the mounting angular position W2 (FIG. 2), because the network cable 50 is directed away from the operating area BB, in particular in the direction of the dust removal connection 29 and/or the suction hose SL. Also in this configuration, the network cable 51 is guided away from the operator when the operator grasps the machine by the grip portion 25 with his right hand.

In principle, it would readily be possible for the grommet 70 to be held directly in a holder receptacle 54 of the machine housing 20, for example on the rear wall 48, and to be clamped there, for example. For example, the holder receptacle 54 has a receptacle groove, which is used as such to accommodate grommet holders 60, 60B, but in which in principle a retaining flange 78 of the cable grommet 70 can also engage. A clamp suitable for clamping the cable grommet 70 in the holder receptacle 54 and overlapping the cable grommet 70, for example like a bracket, could be fastened using screws 56, for example, which are screwed into screw receptacles 55 arranged next to the holder receptacle 54.

However, a flexible mounting concept of the hand-held power tool 10 provides a different procedure:

The holder receptacle 54 is used to accommodate a grommet holder 60 or alternatively a grommet holder 60B, on each of which the cable grommet 70 can be held. The grommet holders 60, 60B are structurally identical, wherein they hold the cable grommet 70 at different exit angles AW with respect to the machine housing 20.

The grommet holders 60, 60B have a grommet receptacle 61, 61B for holding the cable grommet 70 and a cable holding section 62 for holding a section of the network cable 51 protruding in front of the cable grommet 70.

The grommet receptacles 61, 61B comprise a form-fitting receptacle 68, for example a flange receptacle, into which a form-fitting projection 78, for example the mentioned holding flange of the cable grommet 70, can engage in a form-fitting manner Thus, the cable grommet 78 is held on the grommet holder 60 or 60B with high tensile strength with respect to the grommet longitudinal axis TL.

Holding contours 62A, for example flange-like structures or rib structures, are provided on the cable holding section 62 for holding the section of the network cable 51 projecting in front of the cable grommet 70.

The grommet holders 60, 60B each have a pair of grommet holding bodies, for example grommet holding bodies 63, 64 or 63B, 64B, wherein the grommet holding bodies 63, 64 or 63B, 64B are complementary to one another and are adjustable between an open position, in which the cable grommet 70 with the network cable 51 arranged therein is insertable into the grommet receptacle 61, 61B, and a closed position, in which the grommet receptacle 61, 61B is closed and the cable grommet 70 and the network cable 51 are held in the respective grommet holder 60, 60B in a form-fitting manner with high tensile strength respect to the grommet longitudinal axis TL and supported transversely to the grommet longitudinal axis TL.

The grommet holding bodies 63, 64 or 63B, 64B can be plugged onto one another and screwed together, wherein the screws 56 already mentioned are screwed into the screw receptacles 55. The screws 56 are pushed through screw receptacles 65A, 65B on the sleeve holding bodies 63, 64 or 63B, 64B, which are aligned with one another when the grommet holding bodies 63, 64 or 63B, 64B are connected to one another.

One advantageous concept provides that the screw receptacles 65A, 65B are designed as pairs of plug receptacle and plug projection, i.e., for example, the screw receptacles 65A are designed as plug projections and the screw receptacles 65B as plug receptacles for these plug projections that can be plugged into one another.

Furthermore, plug projections 67, for example plug pins, are provided on the grommet holding bodies 63, 63B, which can be plugged into plug receptacles 67B of the grommet holding bodies 64, 64B.

The screw receptacles 65A, 65B and the plug projections 67 and their associated plug receptacles are preferably arranged on opposite longitudinal end areas of the grommet holders 60, 60B, for example the screw receptacles 65A, 65B on the cable holding section 62 and plug projections 67 and the plug receptacles 67B close to the grommet receptacle 61, 61B.

During the screwing or clamping, the screw receptacles 65A, 65B and the plug projections 67 and the plug receptacles 67B form guides, by means of which the grommet holding bodies 63, 64 and 63B, 64B are guided to one another.

Furthermore, the grommet holding bodies 63, 64 or 63B, 64B advantageously form a clamp mount for the cable grommet 70 and a section of the network cable 51 which protrudes in front of the cable grommet 70 and is accommodated in the cable holding section 62.

The cable grommet 70 and the section of the network cable 51 protruding in front of the cable grommet 70 are clamped between the grommet holding bodies 63, 64 or 63B, 64B, for example, by screwing the screws 56 into the screw receptacles 55.

Fastening sections 66 are provided on the outer circumferences of the grommet holders 60, 60B and are accommodated in the holder receptacle 54 of the machine body 20 in the mounted state. The fastening sections 66 have form-fitting contours 66A on their outer circumferences, which are in form-fitting engagement with corresponding counter-form-fitting contours 54A of the holder receptacle 54. For example, the form-fitting contours 66A and the counter-form-fitting contours 54A comprise flange projections on one part of holder receptacle 54 and fastening section 66 which are engaged with flange receptacles on the respective other part of holder receptacle 54 and fastening section 66.

The form-fitting contours 66A and the counter-form-fitting contours 54A advantageously form anti-twist contours, by means of which the cable grommet 70 is held on the grommet holder 60, 60B in a twist-proof manner with respect to the grommet longitudinal axis TL.

The cable holder sections 62 of the grommet holders 60 and 60B extend along cable holder section longitudinal axes HL.

The fastening sections 66 extend along fastening section longitudinal axes BL.

In the present case, the cable holding section longitudinal axes HL and the fastening section longitudinal axes BL are parallel to the machine longitudinal axis ML, wherein an inclination, for example downwards, is also readily possible, however.

The grommet holders 60, 60B extend along longitudinal axes TA, wherein the longitudinal axis TA of the grommet mount 60 has the exit angle AW to the cable holding section longitudinal axis HL and the fastening section longitudinal axis BL, while in the grommet mount 60B, the longitudinal axis TA is aligned with the other two longitudinal axes HL and BL.

Thus, the grommet holders 60, 60B specify the respective exit angle AW for the cable grommet 70 and thus the network cable 51. By simply selecting a suitable grommet holder 60 or 60B, the exit angle AW is thus settable and/or fixable when the hand-held power tool 10 is assembled.

In the cable grommet 70, a cable receptacle section 72 accommodating the network cable 51 and the mounting section 71 provided for mounting on the grommet holder 60 or 60B are arranged aligned with one another, i.e., one behind the other linearly along the grommet longitudinal axis TL.

However, the exit angle AW may also be readily implemented by a corresponding design of a cable grommet, which is indicated by means of an exit angle AW2 of a cable grommet 70B. The cable grommet 70B has a cable receptacle section 72 for the network cable 51 along a grommet longitudinal axis TL and a mounting section 71 angled thereto for accommodating or for mounting on the grommet holder 60 or 60B.

The mounting section 71 can be mounted on the grommet holder 60 or 60B in different rotational positions with respect to the machine longitudinal axis ML, so that the network cable 71 protrudes in front of the machine housing 20 at angles corresponding to these rotational positions with respect to the machine longitudinal axis ML. For example, as a result, the relative position or angular position of the grommet longitudinal axis TL with respect to the tool holder 13 can be the same in both mounting angular positions W1 and W2.

Figure 16:
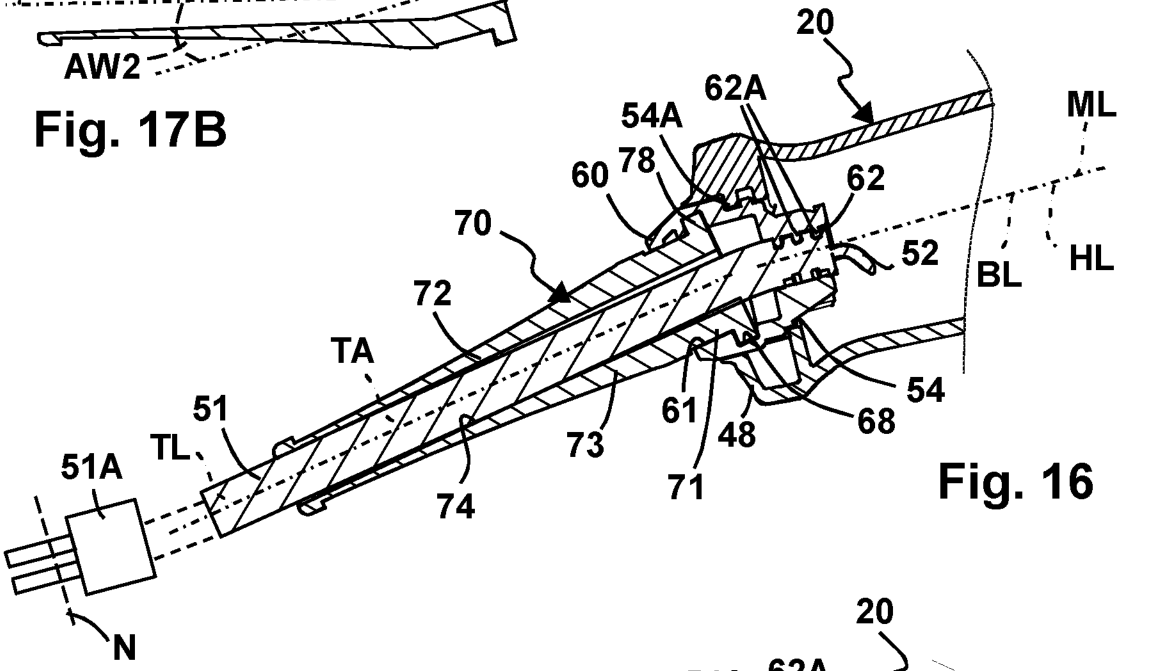
FIG. 16 shows a cross section along a line A-A through the view according to FIG. 15 having the components of the power supply connection according to FIG. 9.
Figure 17:
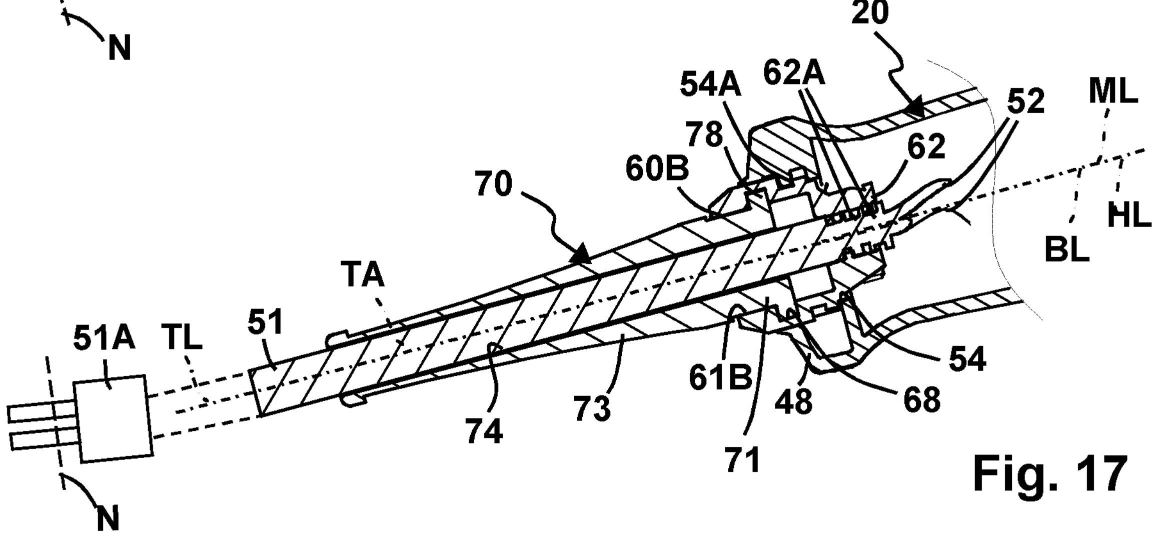
FIG. 17 shows a view corresponding to FIG. 16, but with the components of the power supply connection according to FIG. 10.
Figure 18:
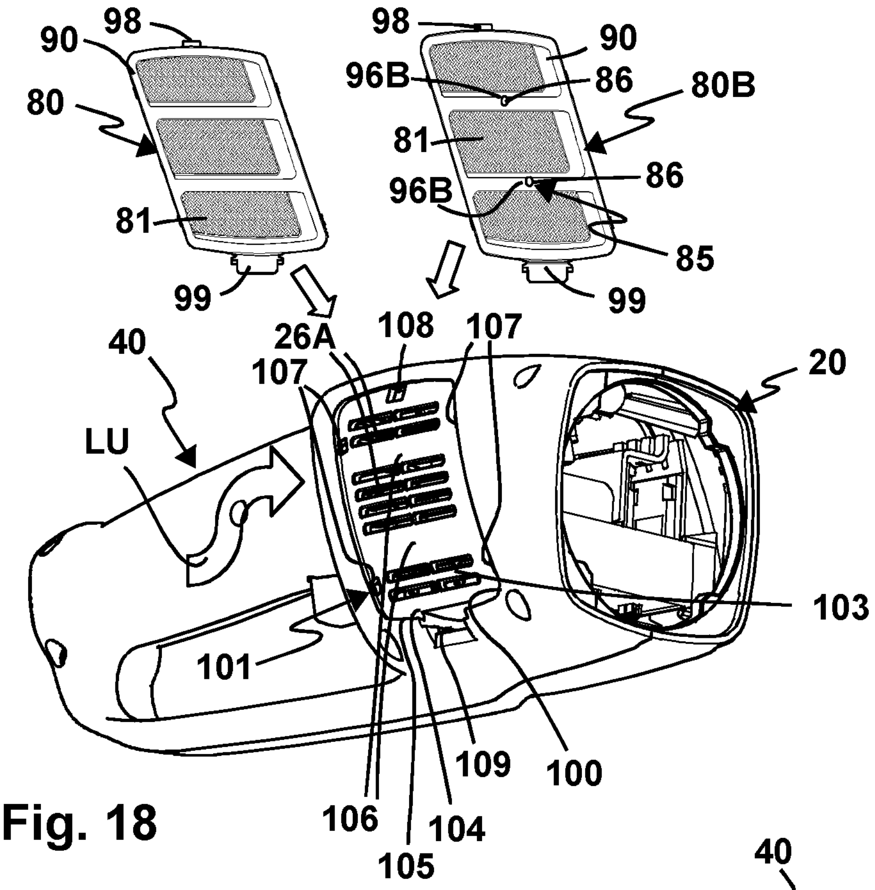
FIG. 18 shows a perspective view of the handle housing part having dust protection devices that have not yet been mounted.
Figure 19:
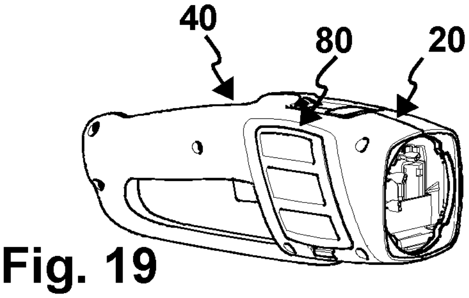
FIG. 19 shows the handle housing part having a mounted dust protection device.
Figure 20:
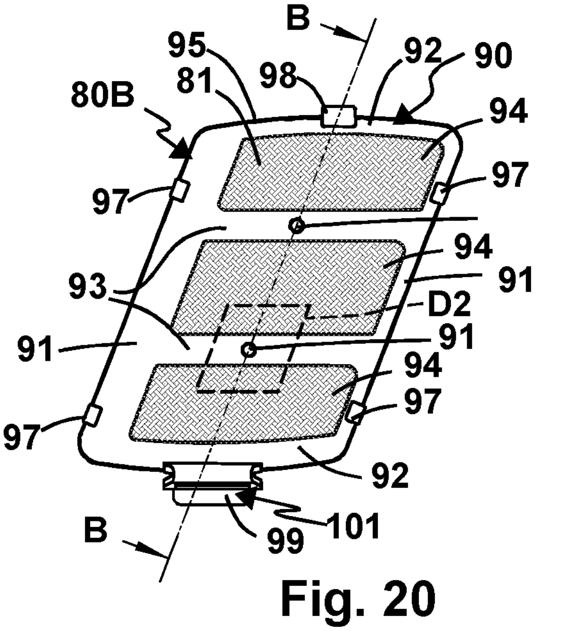
FIG. 20 shows a perspective oblique view from the rear of one of the dust protection devices according to FIG. 18.
Figure 21:
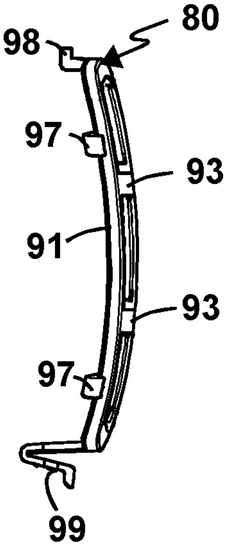
FIG. 21 shows a side view of the dust protection device according to FIG. 20.

In order to maintain the relative position, in particular angular position or angular setting, of the longitudinal axis TL of the sleeve to the tool holder 13 in the two mounting angular positions W1 and W2, different grommet holders can also be used, however, for example a grommet holder 60C, which schematically indicated in FIG. 16 and accommodates the cable grommet 70 at an exit angle AW3 that differs from the exit angle AW.

It is also readily possible, for example, for the grommet holding body 64B to be fastenable on the holder receptacle 54 without the grommet holding body 63B in order to hold the cable grommet 70 directly. If the holder receptacle 54 has an inclination with respect to the machine longitudinal axis ML at the exit angle AW, this can, together with the grommet holding body 64, hold the cable grommet 70 at the exit angle AW with respect to the machine longitudinal axis ML.

Advantageously, dust protection devices 80, 80B are detachably fastenable on the cooling air openings 26A, 26B. The dust protection devices 80, 80B have a filter element 81, for example a metal screen, which is fine-meshed, i.e., has very small air passage openings 82, and is therefore suitable for retaining dust contained in the air flows LU flowing into the cooling air openings 26A, 26B. The filter element 81 is, for example, plate-shaped and flexible in bending.

The filter element 81 is held by a holding frame 90 at its outer edge area 83. The holding frame 90 has longer longitudinal frame sections 91 which are connected to one another by shorter frame sections 92. Overall, the frame sections 91, 92 form an essentially rectangular shape. Preferably, the shorter frame sections 92 are somewhat rounded. The transition areas between the frame sections 91 and 92 preferably also have rounded areas on the outside.

Furthermore, two holding arms 93, for example, extend between the frame sections 91, which are designed in the manner of transverse ribs or transverse webs. Windows 94 are formed between a respective holding arm 93 and a frame section 92 and between adjacent holding arms 93, in which windows the filter element 81 stands freely, so that an air flow LU can flow through it.

The holding arms 93 extends in parallel to the shorter frame sections 98. It is preferred if the holding arms 93 and the frame sections 98 have approximately the same distances from one another in a direction parallel to the longitudinal extension direction of the longer frame sections 91. Thus, the above-mentioned windows 94 between the holding arms 93 and the frame sections 98 are also approximately the same size. In any case, the windows 94 are advantageously positioned such that they are each opposite to a cooling air opening 26A or 26B. The holding arms 93 can advantageously be arranged where no cooling air opening 26A or 26B is provided on the machine housing 20.

The filter element 81 is embedded in the material of the holding frame 90, i.e., in the material of the frame sections 91 and 92 and the material of the holding arms 93, so that it is optimally supported by the holding frame 90 and its holding arms 93.

This material of the holding frame 90 is, for example, a plastic material, in particular a thermoplastic material.

The outer edge region 83 of the filter element 81 is thus embedded in the material of the holding frame 90, so that, for example, the material of the holding frame 90 penetrates the air passage openings 82 there, or that the material of the holding frame 90 penetrates into and/or closes the air passage openings 82.

The outer edge region 83 of the filter element 81 is located within the holding frame 90 but does not project in front of an outer periphery 95 of the holding frame 90.

The dust protection devices 80, 80B are detachably accommodated in filter holders 100 of the machine housing 20.

The cooling air openings 26A, 26B are arranged on a bottom 104 of a respective filter holder 100. Support sections 106 of the bottom 104, which are opposite to the holding arms 93, extend between the cooling air openings 26A, 26B. Therefore, the holding arms 93 are supported or supportable on the support sections 106. The windows 94 or passage openings of the holding frame 90, at which the filter element 81 is free and without overlap, are in any case arranged between the support sections 106, so that the air flow LU can flow through the filter elements 81 in the area of the windows 94 into the cooling air openings 26A, 26B.

The dust protection devices 80 are detachably fastenable on the filter holders 100 and are fixable there using fixing means 101. Therefore, a dust protection device 80 can be readily removed from the filter holder 100 and cleaned, for example if it is dirty. Furthermore, it is possible to use suitable dust protection devices 80 for specific applications, for example having filter elements 81 that have different filter effects.

The filter holder 100 has an inner peripheral contour 105 into which the outer periphery 95 or the outer peripheral contour of the respective holding frame 90 fits in a form-fitting manner.

The bottom 104 has a curved shape, wherein the curvature extends around the machine longitudinal axis ML. A corresponding curvature is also provided in the dust protection device 80, i.e., the frame sections 91 have a curved profile, for example.

Nevertheless, an optimal hold of a respective dust protection device 80 in the filter holder 100 is implementable using the fixing means 101.

The fixing means 101 comprise, for example, holding projections 97 which are arranged on the longer frame sections 91 and have distances to the shorter frame sections 92 and which engage in holding receptacles 107 of the filter holder 100. The holding receptacles 107 are arranged close to the inner peripheral contour 105, for example. Therefore, for example, the holding projections 97 form plug projections and the holding receptacles 107 form plug receptacles.

Furthermore, rear gripping contours 98 and 108 of the fixing means 101 are provided on the holding frame 90 or the dust protection device 80 of the filter holder 100. The rear gripping contours 98 and 108 are provided, for example, by a hook projection and a hook receptacle on one of the shorter frame sections 92 or the inner peripheral contour 105 of the filter holder 100 lying opposite thereto. Further rear gripping contours and/or detent contours are provided on the side of the dust protection device 80 or the inner peripheral contour 105 opposite thereto, for example a detent lug 99 of the dust protection device 80 and a detent receptacle 109 of the filter holder 100. The detent lug 99 has, for example, an actuation section for actuation by an operator in the direction of a release position in which the dust protection device 80 can be removed from the filter holder 100. For this purpose, after releasing the latching of the detent lug 99, the dust protection device 80 is pivoted, for example, around the rear gripping contours 98 and 108 and then the rear gripping contours 98 and 108 are disengaged.

Since the filter element 81 does not protrude in front of the outer periphery 95 of the holding frame 90, but is even to be at a distance from it, the production of the support device 80 is difficult as such, since direct support of the filter element 81 on the edge side is not possible during the production of the holding frame 90, in particular in the case of an injection molding method. To make matters worse, the holding frame 90 has a curved shape, which makes it even more difficult to support the filter element 81 during the production of the holding frame 90.

A mold assembly 200 suitable for use in an injection molding machine (not shown) remedies this. The mold assembly 200 is arranged or arrangeable in a casting assembly or injection molding machine in order to carry out the method explained hereinafter.

The mold assembly 200 comprises a base mold 201 which, together with a closure mold 202, encloses a receptacle cavity 203 which is suitable for producing all of the components of the dust protection device 80 that are different from the filter element 81, for example using a curable material AM, in particular a thermoplastic plastic.

The receptacle cavity 203 has frame sections 204 for producing the holding frame 90 and holding arm sections 205 for producing the holding arms 93, wherein the frame sections 204 and the holding arm sections 205 communicate with one another so that the material AM, when it is introduced into the receptacle cavity 203, in particular injected, flows through all sections 204 and 205.

Furthermore, the material AM also penetrates into cavities 207 for producing the holding projections 97, a cavity 208 for producing the rear gripping contour 98, for example a hook-shaped cavity 208, and finally into a cavity 209 for producing the detent lug 99.

So that the filter element 81 is not wetted by the material AM in the region of the window 94, frame projections 213 are provided on the molds 201 and 202, between which the filter element 81 is sandwiched.

However, the filter element 81 is to be inserted into the receptacle cavity 203, in particular the base mold 201, in such a way that its outer edge region 83 is at a distance from the inner circumference 214 of the receptacle cavity 203.

In order to now hold the filter element 81 in this position, the filter element 81 has a support receptacle arrangement 85 having support receptacles 86. In the base mold 201, mold support projections 210 are provided, which protrude from a bottom 214 of the base mold 201 at least when the filter element 81 is being introduced into the receptacle cavity 203. The bottom 214 forms a frontal delimitation of the receptacle cavity 203.

The mold support projections 210 are provided in the area of the holding arm sections 205 and the support receptacles 86 are spaced apart appropriately from the outer edge area 83 of the filter element 81 such that the mold support projections 210 can engage in the support receptacles 86. A diameter D86 and thus a cross section of the support receptacles 86 is significantly larger than a diameter and thus a cross section of the air passage openings 82, which is so narrow and small that it is not individually dimensioned in the drawing. The filter element 81 is, for example, close-meshed and can thus extremely effectively prevent dust from entering the interior of the machine housing 20.

When the filter element 81 is held on the mold support projections 210 as described, the closure mold 202 is adjusted relative to the base mold 201 in the sense of closing the receptacle cavity 203.

The filter element 81 is then advantageously clamped and/or sandwiched by the frame projections 213.

The mold support projections 210 can then be moved entirely or partially out of the support receptacles 86 by means of guides 211, so that the material AM then penetrating into the receptacle cavity 203 to produce the holding frame 90 and the holding arms 93 can at least partially penetrate into the support receptacles 86 in order to form support projections 96 there.

However, it is also possible that at least one of the mold support projections 210 is not moved out of the support receptacle 86 assigned to it, but rather remains in the support receptacle 86 while the material AM is being introduced into the receptacle cavity 203. Such a mold support projection 210 then protrudes, for example, into a cavity 212 of a closure mold 202B that is otherwise the same as the closure mold 202, so that the material AM flows around the mold support projection 210 and, for example, passage openings 96B are formed on the holding arms 93. This then results in a dust protection device 80B, in which the support receptacles 86 are aligned with the passage openings 96B.

Figure 25:
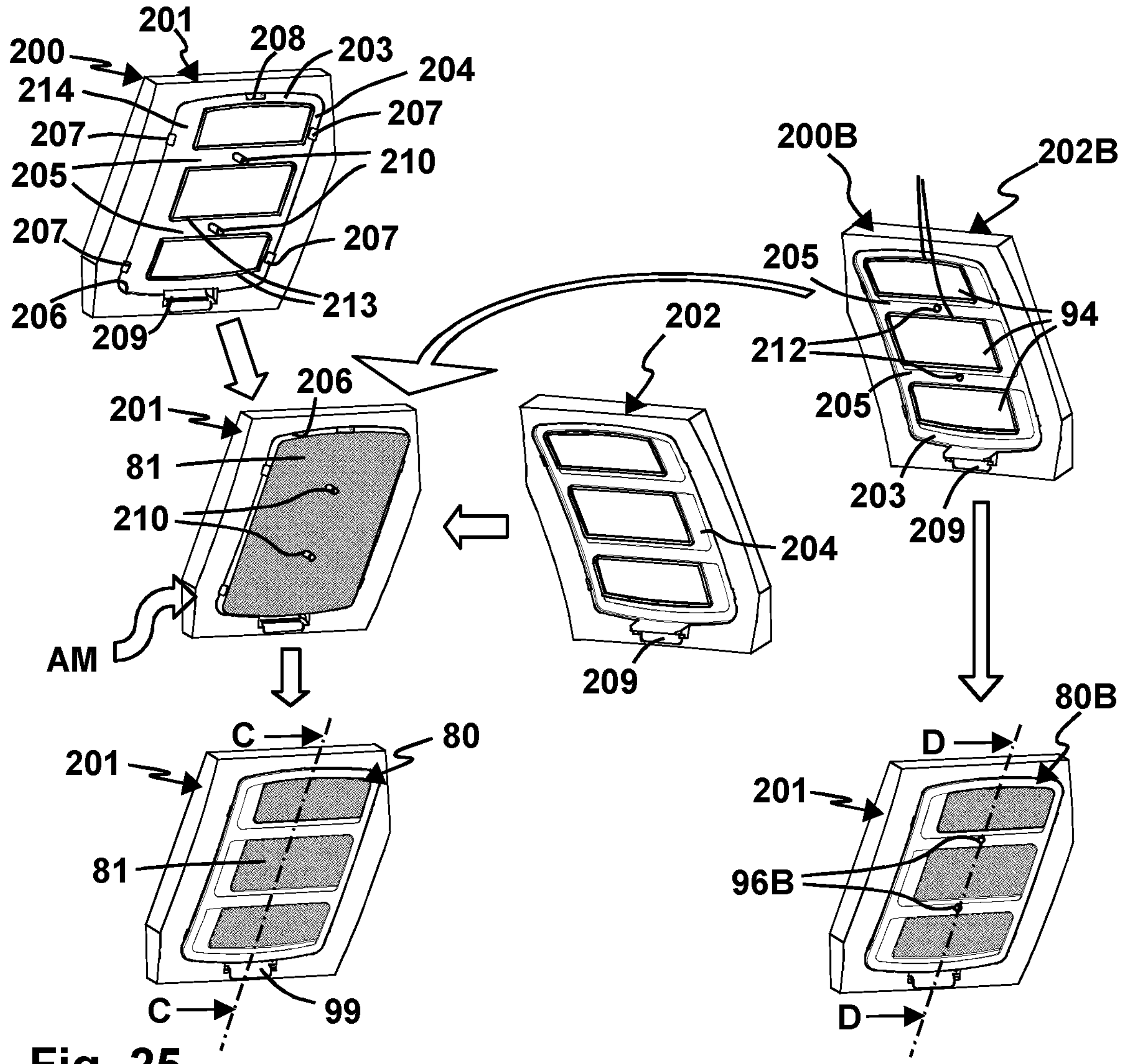
FIG. 25 shows a perspective oblique view with molds for producing the dust protection devices of FIGS. 18-24.
Figure 28:
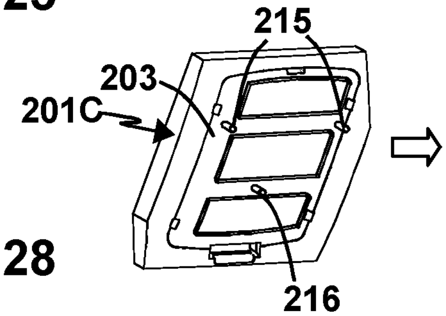
FIG. 28 shows a perspective oblique view of another base mold for producing an alternative dust protection device.

A closure body, for example a light-emitting diode or the like, can be inserted into such a passage opening 96B in order to close the passage opening 96B. The overview representation of FIG. 25 makes it clear that the base mold 201 can optionally be closed using the closure mold 202 or the closure mold 202B in order to produce the dust protection devices 80 or 80B.

Of course, mold support projections do not necessarily have to engage in the area of holding arms and/or at large distances from the outer edge area 83 of a filter element 81 in the sense of a support. This is indicated using base molds 201C and 201D, which can each be closed using the closure mold 202 in order to close their respective receptacle cavities 203 and to produce dust protection devices.

Apart from the arrangement of their mold support projections, the base molds 201C and 201D correspond to the base mold 201 already described.

Figure 29:
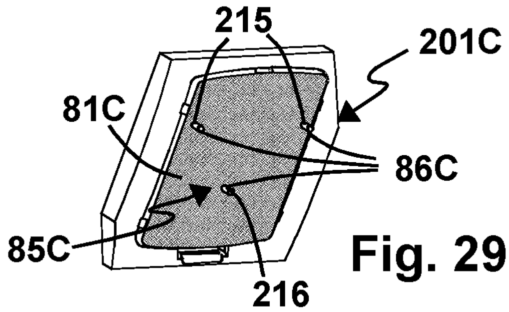
FIG. 29 shows the base mold according to FIG. 29, having a filter element held thereon.
Figure 30:
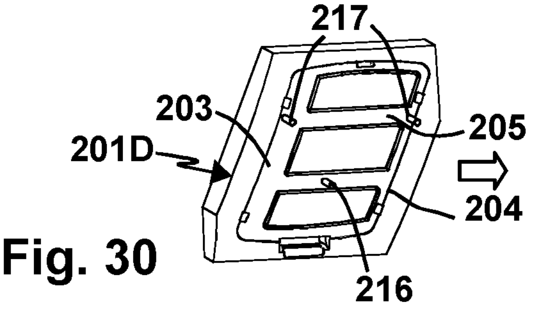
FIG. 30 shows a further base mold in an oblique view for the production of a further dust protection device.
Figure 31:
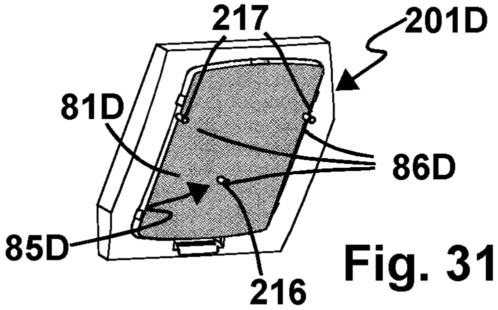
FIG. 31 shows the base mold according to FIG. 30, having a filter element held thereon.

In the case of the base mold 201C, mold support projections 215 are provided, for example, which are arranged in the area of the frame sections 204, preferably close to one of the holding arm sections 205. Another mold support projection 216 is arranged, for example, in the area of the holding arm section 205, in particular along the center thereof. The mold support projections 215, 216 are thus arranged in the corner regions of a holding triangle and can optimally hold the filter element 81C, which has a support receptacle arrangement 85C having support receptacles 80C corresponding to the arrangement of the mold support projections 215, 216 (see FIG. 29).

In the base mold 201D, the mold support projection 216 is also provided. Mold support projections 217 are arranged similarly to the mold support projections 215 near the support arm section 205 which has no mold support projection 216, but closer to the inner periphery 206. Corresponding to the arrangement of the mold support projections 215, 217, support receptacles 86D of a support receptacle arrangement 85D are provided on a filter element 81D, which are attachable and/or pluggable onto the mold support projections 215, 217. Advantageously, the filter element 81D is held by the mold support projections 217 at its outer periphery.

| | |
|---|---|
| 10 | hand-held power tool |
| 11 | drive motor |
| 12 | Gear |
| 13 | tool holder axis of rotation D |
| 14 | work tool |
| 15 | Switch |
| 16 | speed sensor |
| 17 | Display |
| 18 | energizing device |
| 19 | |

-continued

| | |
|---|---|
| 20 | machine housing |
| ML | machine longitudinal axis |
| 21 | front end area |
| 22 | rear longitudinal end area |
| 23 | mounting interface |
| W1 | W2 mounting angular positions |
| 24 | handle of |
| L24 | handle axis |
| 24A | grip section |
| 24B | side leg |
| 24C | pivot bearing pivot axis S24 |
| 24D | fixing device |
| 24E | clamping screw |
| 25 | rear grip section |
| 25A | protective body |
| 25B | reach-through opening |
| 26 | cooling air opening AB |
| 27 | operating area |
| 28 | protective cover work tool |
| 29 | dust removal connection |
| | dust removal connection longitudinal axis |
| 30 | drive housing part |
| 31 | passage opening |
| 32 | form-fitting contour |
| 33 | axial form-fitting contour |
| 33A | flange receptacle |
| 33C | flange projection |
| 34 | rotational form-fitting contour |
| 34A | radial form-fitting receptacle |
| 35 | cylindrical housing body |
| 35C | drive housing body |
| 36 | end wall |
| 37 | housing wall peripheral wall |
| 37A | contact section |
| 37B | Opening |
| 37C | flat sections |
| 37D | corner area |
| 38 | housing body for gear |
| 39 | Screws |
| 40 | handle housing part |
| 40G | housing section with 26 |
| 41 | passage opening |
| 42 | counter-form-fitting contour |
| 43 | axial counter-form-fitting contour |
| 43A | flange projection |
| 44 | rotational counter-form-fitting contour |
| 44A | radial form-fitting projection |
| 45A | B partial housing element |
| 45C | handle housing body |
| 46 | end wall |
| 47 | housing wall peripheral wall |
| 47A | contact section |
| 47B | support projection |
| 47C | flat sections |
| 47D | corner area |
| 48 | rear wall |
| 49 | assembly means |
| 50 | power supply connection |
| 51 | network cable |
| 52 | conductor wires |
| 53 | connection terminals |
| 54 | holder receptacle |
| 54A | counter-form-fitting contours |
| 55 | screw receptacle |
| 56 | screws |
| 57 | |
| 58 | |
| 59 | |
| 60 | B grommet holder |
| 61 | B grommet holder |
| 62 | cable holding section |
| HL | cable holding section longitudinal axis |
| 62A | holding contours for network cables |
| 63 | B grommet holding body in receptacle |
| 64 | B grommet holding body cover |
| 65A | B screw receptacle on 63 64 |
| 66 | fastening section outside |
| 66A | form-fitting contours |
| BL | fastening section longitudinal axis |

-continued

| | |
|---|---|
| 67 | plug projections plug pins |
| 68 | form-fitting receptacle flange receptacle |
| 69 | |
| 70 | cable grommet |
| TL | grommet longitudinal axis |
| 71 | mounting section |
| 72 | cable receptacle section guide section |
| 73 | grommet body |
| 74 | cable passage opening |
| 75 | |
| 76 | |
| 77 | |
| 78 | form-fitting projection holding flange |
| 79 | air flows LU |
| 80 | dust protection device |
| 81 | filter element |
| 82 | air passage openings |
| 83 | outer edge area |
| 84 | |
| 85 | support receptacle arrangement |
| 86 | support receptacle |
| 87 | |
| 88 | |
| 89 | |
| 90 | holding frame |
| 91 | longer frame sections |
| 92 | shorter frame sections |
| 93 | holding arm |
| 94 | window |
| 95 | outer periphery |
| 96 | support projection |
| 96B | passage opening |
| 97 | lateral holding projection |
| 98 | rear gripping contour hook projection |
| 99 | detent lug |
| 100 | filter holder |
| 101 | fixing means |
| 102 | |
| 103 | lattice structure |
| 104 | bottom |
| 105 | inner peripheral contour |
| 106 | support sections on bottom 104 |
| 107 | lateral holding receptacle |
| 108 | rear gripping contour hook receptacle |
| 109 | detent receptacle |
| 200 | mold assembly |
| 201 | base mold |
| 202 | closure mold |
| 203 | receptacle cavity |
| 204 | frame sections of 203 |
| 205 | holding arm section of 203 |
| 206 | inner periphery of receptacle cavity 203 |
| 207 | lateral cavity for holding projection |
| 208 | cavity for rear gripping contour hook projection |
| 209 | cavity for detent projection |
| 210 | mold support projection |
| 211 | guide for mold support projection |
| 212 | cavity for support projection at 202 |
| 213 | frame projections for window 94 |
| 214 | bottom of receiving cavity 203 at 201 |
| 215 | mold support projections frame 201C |
| 216 | mold support projection holding arm 201C |
| 217 | mold support projections frame 201D |
| 218 | |
| 219 | |
| AM | curable material |

The invention claimed is:

1. A hand-held power tool having a machine housing in which a drive motor for driving a tool holder for a work tool is accommodated, wherein the machine housing has a drive housing part and a handle housing part, wherein the drive housing part has the tool holder drivable by the drive motor and the handle housing part has a grip section to be grasped by an operator, wherein the handle housing part protrudes from the drive housing part in the direction of a machine longitudinal axis, wherein the handle housing part is mounted on the drive housing part in a mounted state, and wherein a form-fitting contour is arranged on the drive housing part and a counter-form-fitting contour is arranged on the handle housing part, which, in the mounted state, engage in a form-fitting manner in at least two different mounting angular positions in order to hold the handle housing part on the drive housing part in a rotationally fixed and axially immovable manner with respect to the machine longitudinal axis, and wherein the form-fitting contour comprises an end wall, an axial wall and a flange projection formed integrally in the drive housing part, the integrally formed end wall extending radially inward perpendicular to the machine longitudinal axis, the integrally formed axial wall extending in an axial direction from the end wall parallel to the machine longitudinal axis, and the integrally formed flange projection extending radially outward from the axial wall perpendicular to the machine longitudinal axis, wherein a flange receptacle is formed between the end wall and the flange projection, and wherein the counter-form-fitting contour comprises an end wall formed integrally in the handle housing part, the integrally formed end wall extending radially inward perpendicular to the machine longitudinal axis and terminating at an integrally formed flange projection, and wherein the integrally formed flange projection of the counter-form-fitting contour of the handle housing part is received within the flange receptacle of the form-fitting contour of the drive housing part.

2. The hand-held power tool as claimed in claim 1, wherein the form-fitting contour is fixedly arranged on a drive housing body of the drive housing part or the counter form-fitting contour is fixedly arranged on a handle housing body of the handle housing part.

3. The hand-held held power tool as claimed in claim 1, wherein the form-fitting contour comprises an axial form-fitting contour and the counter-form-fitting contour comprises an axial counter-form-fitting contour, which engage in one another in a form-fitting manner in the mounted state and hold the handle housing part and the drive housing part onto one another so they are axially immovable with respect to the machine longitudinal axis but rotatable around the machine longitudinal axis.

4. The hand-held held power tool as claimed in claim 1, wherein the flange projection of the form-fitting contour and the flange projection of the counter-form-fitting contour extend annularly around the machine longitudinal axis and the flange receptacle of the form-fitting contour extends annularly around the machine longitudinal axis, wherein the flange projection of the counter-form-fitting contour and the flange receptacle of the form-fitting contour interlock in a form-fitting manner in the mounting position for the axially immovable fastening of the handle housing part on the drive housing part.

5. The hand-held held power tool as claimed in claim 1, wherein the form-fitting contour further comprises at least one rotational form-fitting contour assigned to the mounting angular positions and the counter-form-fitting contour further comprises at least two rotational counter-form-fitting contours or the form-fitting contour further comprises at least two rotational form-fitting contours assigned to the mounting angular positions and the counter-form-fitting contour further comprises at least one rotational counter-form-fitting contour, wherein, in each mounting angular position, at least one pair of rotational form-fitting contour and rotational counter-form-fitting contour is engaged and holds the drive housing part in a rotationally-fixed manner with respect to the machine longitudinal axis on one another.

6. The hand-held power tool as claimed in claim 5, wherein, in the at least two mounting angular positions, in each case at least two pairs of rotational form-fitting contour and rotational counter-form-fitting contour having an angular distance from one another with respect to the machine longitudinal axis are engaged with one another.

7. The hand-held power tool as claimed in claim 5, wherein the at least one rotational form-fitting contour and the at least one rotational counter-form-fitting contour can only be disengaged when the axial form-fitting contour and the axial counter-form-fitting contour are disengaged or are disengaged at the same time the at least one rotational form-fitting contour and the at least one rotational counter-formfitting contour.

8. The hand-held held power tool as claimed in claim 1, wherein the handle housing part and the drive housing part each have at least one housing wall, which has a contact section that is not circular with respect to the machine longitudinal axis wherein the contact sections of the housing walls abut one another in the mounted state and prevent the handle housing part and the drive housing part from rotating relative to one another.

9. The hand-held power tool as claimed in claim 1, wherein at least one of the handle housing part or the drive housing part is formed from at least two partial housing elements, which are fixedly connected to one another in the mounted state in a materially-bonded manner or by means of assembly means, and that form the respective handle housing part or drive housing part, wherein the counter-form-fitting contour of the handle housing part and the form-fitting contour of the drive housing part can be engaged with one another by the mounting of the partial housing elements onto one another.

10. The hand-held power tool as claimed in claim 9, wherein the handle housing part and the drive housing part are rotatable relative to one another in relation to the machine longitudinal axis only by removing at least one of the partial housing elements from the respective other partial housing element or by moving both partial housing elements away from one another.

11. The hand-held held power tool as claimed in claim 1, wherein the counter form-fitting contour and the form-fitting contour can be engaged with one another exclusively by mounting the partial housing elements onto one another.

12. The hand-held held power tool as claimed in claim 1, wherein at least one of the handle housing part or the drive housing part is designed completely or at least in the area of the counter-form-fitting contour or form-fitting contour as a one-piece cylindrical housing body or has a cylindrical housing body.

13. The hand-held power tool as claimed in claim 1, wherein at least one electrical control component for activating the drive motor actuatable by an operator, for switching on or for influencing a speed of the drive motor, is arranged on the handle housing part.

14. The hand-held power tool as claimed in claim 1, wherein a power supply connection for connecting the hand-held power tool to an electrical power supply network by means of a network cable is arranged on the handle housing part, wherein a cable grommet for guiding the network cable away from the machine housing along a grommet longitudinal axis of the cable grommet is arranged on the power supply connection, wherein the cable grommet is held in a grommet receptacle of a grommet holder on the machine housing.

15. The hand-held power tool as claimed in claim 14, wherein the grommet longitudinal axis has an exit angle of between 2° and 45° in relation to the machine longitudinal axis.

16. The hand-held power tool as claimed in claim 14, wherein the grommet holder is arranged or held or formed between opposite partial housing elements of the machine housing.

17. A modular system for producing a hand-held power tool as claimed in claim 1 or a second hand-held power tool different therefrom using the same handle housing part, wherein the modular system has at least two different drive housing parts, which have form-fitting contours matching the counter-form-fitting contours, and on which the handle housing part is mountable to produce the respective hand-held power tool.

18. A hand-held power tool having a machine housing in which a drive motor for driving a tool holder for a work tool is accommodated, wherein the machine housing has a drive housing part and a handle housing part, wherein the drive housing part has the tool holder drivable by the drive motor and the handle housing part has a grip section to be grasped by an operator, wherein the handle housing part protrudes from the drive housing part in the direction of a machine longitudinal axis, wherein the handle housing part is mounted on the drive housing part in a mounted state, and wherein a form-fitting contour is arranged on the drive housing part and a counter-form-fitting contour is arranged on the handle housing part, which, in the mounted state, engage in a form-fitting manner in at least two different mounting angular positions in order to hold the handle housing part on the drive housing part in a rotationally fixed and axially immovable manner with respect to the machine longitudinal axis, and wherein the form-fitting contour comprises at least one rotational form-fitting contour assigned to the mounting angular positions and the counter-form-fitting contour comprises at least two rotational counter-form-fitting contours or the form-fitting contour comprises at least two rotational form-fitting contours assigned to the mounting angular positions and the counter-form-fitting contour comprises at least one rotational counter-form-fitting contour, wherein, in each mounting angular position, at least one pair of rotational form-fitting contour and rotational counter-form-fitting contour is engaged and holds the drive housing part in a rotationally-fixed manner with respect to the machine longitudinal axis on one another, and wherein the hand-held power tool comprises at least three rotational form-fitting contours and at least three, rotational counter-form-fitting contours, wherein the rotational-form-fitting contours and the rotational counter-form-fitting contours have the same angular distances from one another with respect to the machine longitudinal axis, so that in each of the at least two mounting angular positions, a pair of rotational form-fitting contour and rotational counter-form-fitting contour is engaged with one another.

19. A hand-held power tool having a machine housing in which a drive motor for driving a tool holder for a work tool is accommodated, wherein the machine housing has a drive housing part and a handle housing part, wherein the drive housing part has the tool holder drivable by the drive motor and the handle housing part has a grip section to be grasped by an operator, wherein the handle housing part protrudes from the drive housing part in the direction of a machine longitudinal axis, wherein the handle housing part is mounted on the drive housing part in a mounted state, and wherein a form-fitting contour is arranged on the drive housing part and a counter-form-fitting contour is arranged on the handle housing part, which, in the mounted state, engage in a form-fitting manner in at least two different mounting angular positions in order to hold the handle housing part on the drive housing part in a rotationally fixed and axially immovable manner with respect to the machine longitudinal axis, and wherein the form-fitting contour comprises at least one rotational form-fitting contour assigned to the mounting angular positions and the counter-form-fitting contour comprises at least two rotational counter-form-fitting contours or the form-fitting contour comprises at least two rotational form-fitting contours assigned to the mounting angular positions and the counter-form-fitting contour comprises at least one rotational counter-form-fitting contour, wherein, in each mounting angular position, at least one pair of rotational form-fitting contour and rotational counter-form-fitting contour is engaged and holds the drive housing part in a rotationally-fixed manner with respect to the machine longitudinal axis on one another, and wherein the at least one rotational form-fitting contour comprises a radial form-fitting projection extending radially to the machine longitudinal axis and the at least one rotational counter-form-fitting contour comprises a radial form-fitting receptacle extending radially to the machine longitudinal axis or the at least one rotational form-fitting contour comprises a radial form-fitting receptacle extending radially to the machine longitudinal axis and the at least one rotational counter-form-fitting contour comprises a radial form-fitting projection extending radially to the machine longitudinal axis.

20. The hand-held power tool as claimed in claim 19, wherein the at least one radial form-fitting projection projects in front of the flange projection or the at least one radial form-fitting receptacle is designed as a depression on the flange receptacle.

21. A hand-held power tool having a machine housing in which a drive motor for driving a tool holder for a work tool is accommodated, wherein the machine housing has a drive housing part and a handle housing part, wherein the drive housing part has the tool holder drivable by the drive motor and the handle housing part has a grip section to be grasped by an operator, wherein the handle housing part protrudes from the drive housing part in the direction of a machine longitudinal axis, wherein the handle housing part is mounted on the drive housing part in a mounted state, and wherein a form-fitting contour is arranged on the drive housing part and a counter-form-fitting contour is arranged on the handle housing part, which, in the mounted state, engage in a form-fitting manner in at least two different mounting angular positions in order to hold the handle housing part on the drive housing part in a rotationally fixed and axially immovable manner with respect to the machine longitudinal axis, and wherein a power supply connection for connecting the hand-held power tool to an electrical power supply network by means of a network cable is arranged on the handle housing part, wherein a cable grommet for guiding the network cable away from the machine housing along a grommet longitudinal axis of the cable grommet is arranged on the power supply connection, wherein the cable grommet is held in a grommet receptacle of a grommet holder on the machine housing, and wherein the grommet longitudinal axis has an exit angle of between 2° and 45° in relation to the machine longitudinal axis, and wherein the cable grommet is fixable on the grommet receptacle or the machine housing in at least two exit angles different from one another with respect to the tool receptacle or with respect to the machine longitudinal axis.

22. A hand-held power tool having a machine housing in which a drive motor for driving a tool holder for a work tool is accommodated, wherein the machine housing has a drive housing part and a handle housing part, wherein the drive housing part has the tool holder drivable by the drive motor and the handle housing part has a grip section to be grasped by an operator, wherein the handle housing part protrudes from the drive housing part in the direction of a machine longitudinal axis, wherein the handle housing part is mounted on the drive housing part in a mounted state, and wherein a form-fitting contour is arranged on the drive housing part and a counter-form-fitting contour is arranged on the handle housing part, which, in the mounted state, engage in a form-fitting manner in at least two different mounting angular positions in order to hold the handle housing part on the drive housing part in a rotationally fixed and axially immovable manner with respect to the machine longitudinal axis, and wherein a power supply connection for connecting the hand-held power tool to an electrical power supply network by means of a network cable is arranged on the handle housing part, wherein a cable grommet for guiding the network cable away from the machine housing along a grommet longitudinal axis of the cable grommet is arranged on the power supply connection, wherein the cable grommet is held in a grommet receptacle of a grommet holder on the machine housing, and wherein the cable grommet is fixable on the grommet receptacle or the machine housing in the same relative position or angular position of the grommet longitudinal axis with respect to the tool holder in the at least two mutually different mounting angular positions of the handle housing part with respect to the drive housing part.

* * * * *